United States Patent
Zhang et al.

(10) Patent No.: US 12,402,024 B2
(45) Date of Patent: Aug. 26, 2025

(54) TECHNIQUES FOR AUTONOMOUS SELF-INTERFERENCE MEASUREMENTS

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 17/814,707

(22) Filed: Jul. 25, 2022

(65) Prior Publication Data

US 2024/0031840 A1 Jan. 25, 2024

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC .............................. H04W 24/08; H04W 24/10
See application file for complete search history.

(56) References Cited

U.S. PATENT DOCUMENTS

| | | | | |
|---|---|---|---|---|
| 2012/0281578 | A1* | 11/2012 | Hong | H04L 5/001 370/252 |
| 2021/0160880 | A1* | 5/2021 | Zhang | H04W 72/0453 |
| 2021/0167877 | A1* | 6/2021 | Choi | H04B 17/345 |
| 2021/0320710 | A1* | 10/2021 | Koskela | H04B 17/309 |
| 2021/0368369 | A1* | 11/2021 | Zhang | H04W 24/10 |
| 2022/0053353 | A1* | 2/2022 | Lee | H04B 7/0408 |
| 2022/0264478 | A1* | 8/2022 | Miao | H04W 52/242 |
| 2024/0171252 | A1* | 5/2024 | Bhamri | H04L 5/0048 |

* cited by examiner

*Primary Examiner* — Derrick V Rose
(74) *Attorney, Agent, or Firm* — Dinsmore & Shohl LLP

(57) ABSTRACT

Certain aspects of the present disclosure provide techniques for user equipment-based autonomous self-interference measurement. An example method includes transmitting at least one uplink (UL) transmission using at least one UL transmit beam, performing self-interference measurements using at least one downlink (DL) receive beam to measure, for full duplex operation, self-interference associated with the at least one UL transmission transmitted using the at least one UL transmit beam, and transmitting a measurement report indicating the measured self-interference associated with the at least one UL transmission transmitted using the at least one UL transmit beam.

29 Claims, 18 Drawing Sheets

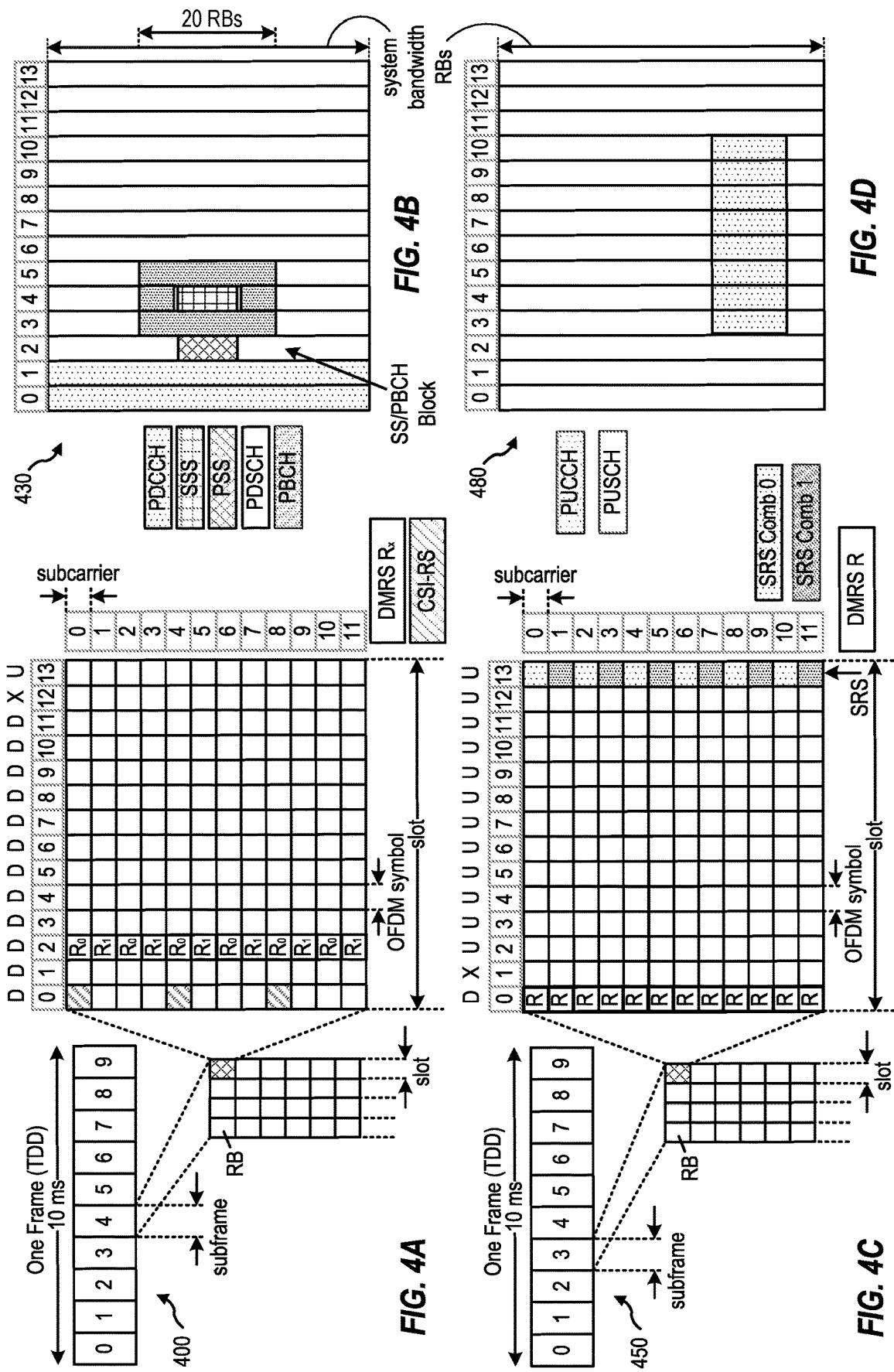

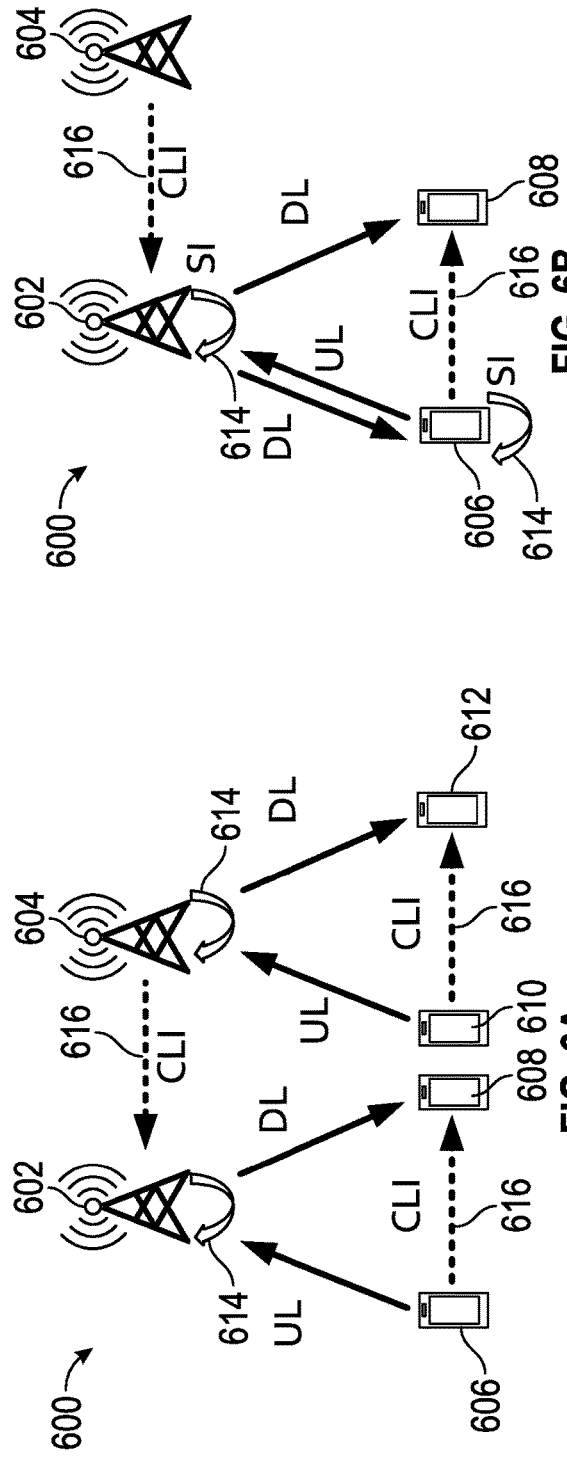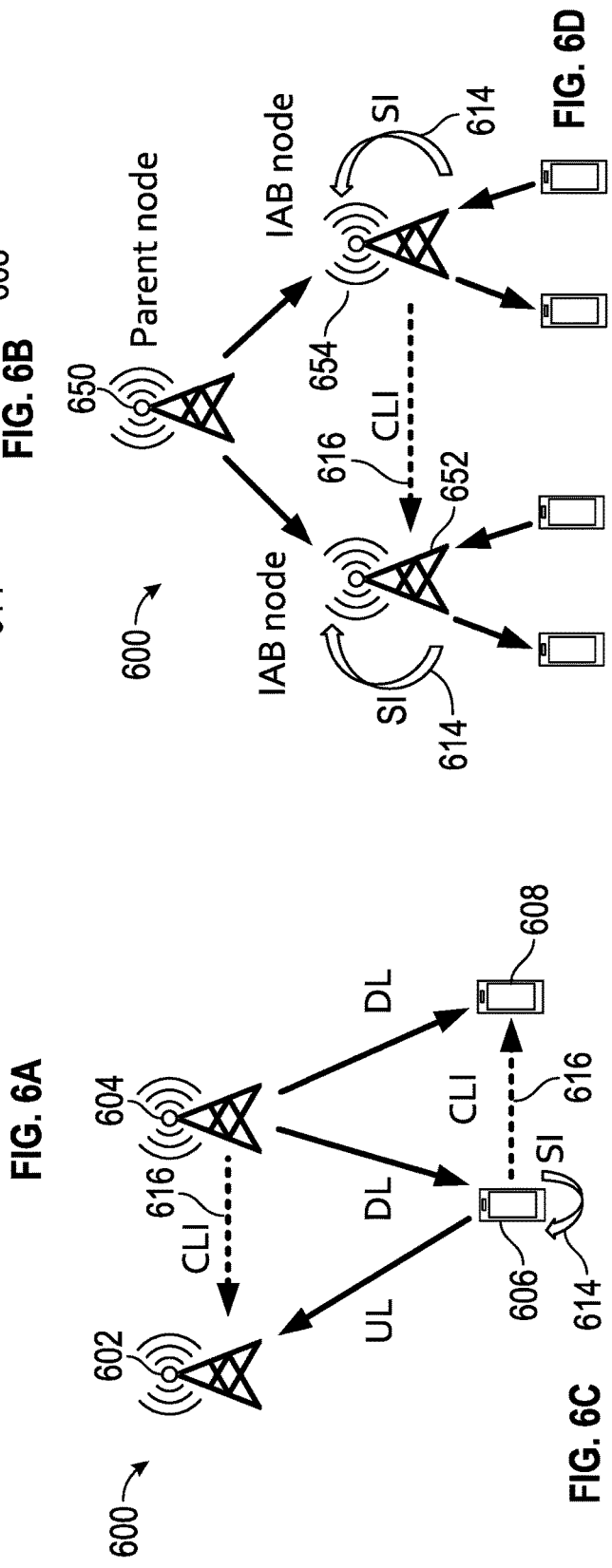

TECHNIQUES FOR AUTONOMOUS SELF-INTERFERENCE MEASUREMENTS

BACKGROUND

Field of the Disclosure

Aspects of the present disclosure relate to wireless communications, and more particularly, to techniques for user equipment (UE)-based autonomous self-interference measurements.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes transmitting at least one uplink (UL) transmission using at least one UL transmit beam; performing self-interference measurements using at least one downlink (DL) receive beam to measure, for full duplex operation, self-interference associated with the at least one UL transmission transmitted using the at least one UL transmit beam; and transmitting a measurement report indicating the measured self-interference associated with the at least one UL transmission transmitted using the at least one UL transmit beam.

Another aspect provides a method for wireless communication by a network entity. The method includes receiving at least one UL transmission associated at least one UL transmit beam of a UE; and receiving a measurement report, for full duplex operation, indicating a measured self-interference of the UE associated with the at least one UL transmission transmitted using the at least one UL transmit beam.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIGS. 6A, 6B, 6C, and 6D illustrates different deployment and interference scenarios that may occur within a wireless communications network.

DETAILED DESCRIPTION

Figure 1:
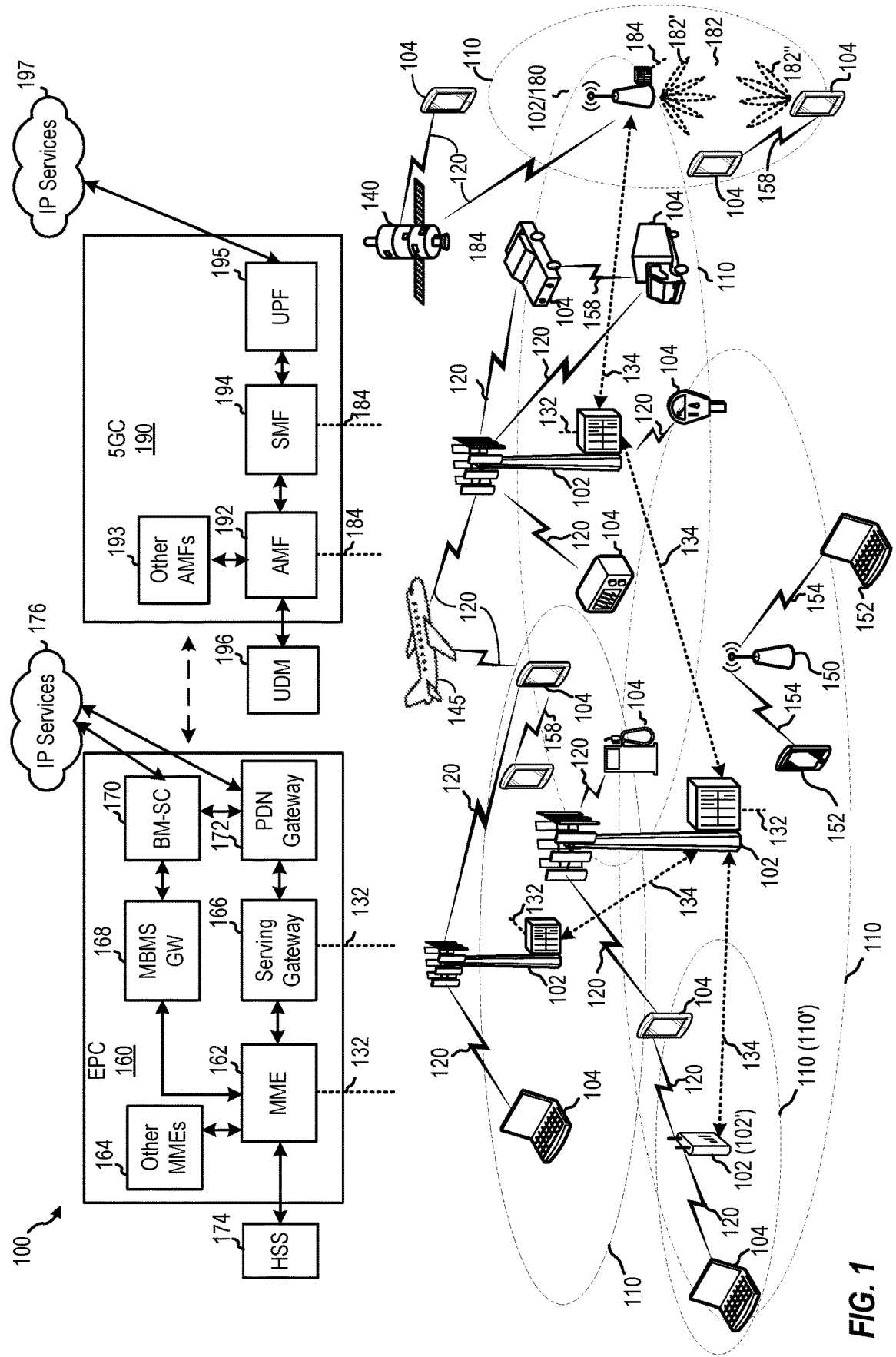
FIG. 1 depicts an example wireless communications network.

Aspects of the present disclosure provide apparatuses, methods, processing systems, and computer-readable mediums for user equipment (UE)-based autonomous self-interference measurements.

For example, in some cases, a UE may be capable of communicating in a wireless communication network with a network entity (e.g., a base station or some other network entity) using full duplex communication. During full duplex communication, the UE may be capable of transmitting uplink transmissions to the network entity while simultaneously receiving downlink transmissions from the network entity or another network entity.

In some cases, however, the uplink transmissions transmitted by the UE may cause interference to the downlink transmissions received from the network entity, known as self-interference. In some cases, the UE may be configured to measure the self-interference in a first transmission slot and take action to reduce this self-interference in a further second slot. Traditionally, when performing these self-interference measurement, the UE would use dedicated resources and signals within the wireless communication network configured specifically for performing self-interference measurements. However, the dedicated resources for transmitting the signals for performing the self-interference measurements consume time-frequency resources within the wireless communication network as well as power resources at the UE. Additionally, these dedicated resources may need to be configured by the network entity, consuming additional power resources at the network entity and time-frequency resources within the wireless communication network for transmitting this configuration information.

Accordingly, to reduce resource (e.g., time-frequency, power, etc.) consumption when performing self-interference measurements, aspects of the present disclosure provide techniques to allow the UE to perform autonomous self-interference measurements using previously-scheduled uplink transmissions. By allowing the UE to perform the self-interference measurements autonomously, the consumption of power resources at the network entity and time-frequency resources in the wireless communication network needed to configure the self-interference measurements may be reduced. Moreover, allowing the UE to "re-use" already/previously-scheduled uplink transmissions to perform the self-interference measurements eliminates the need for the dedicated resources and signals, thereby reducing time-frequency resources consumption within the wireless communication network as well as power resources at the UE as compared to the traditional techniques for performing self-interference measurements that required the use of the dedicated resources and signals.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
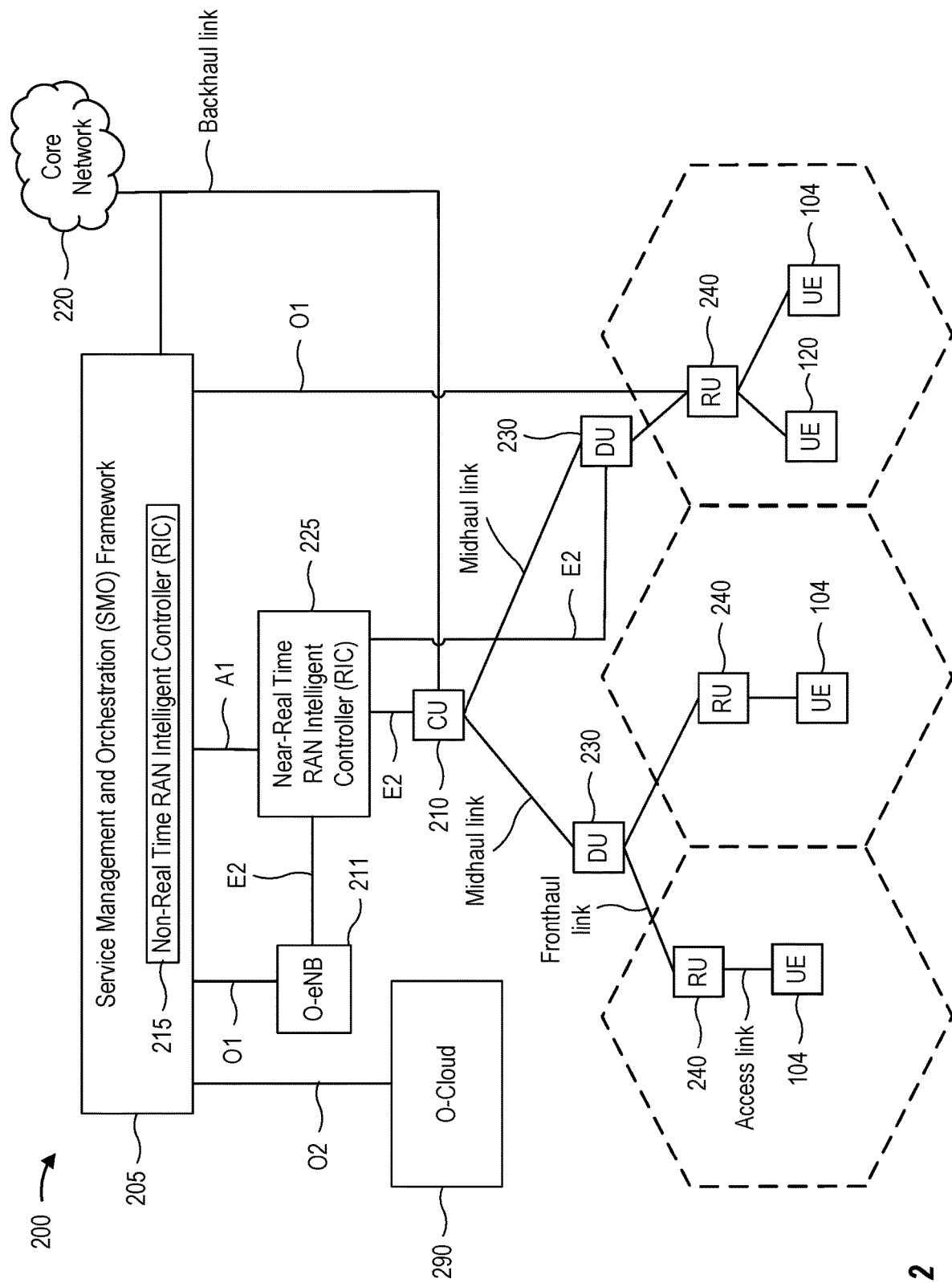
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
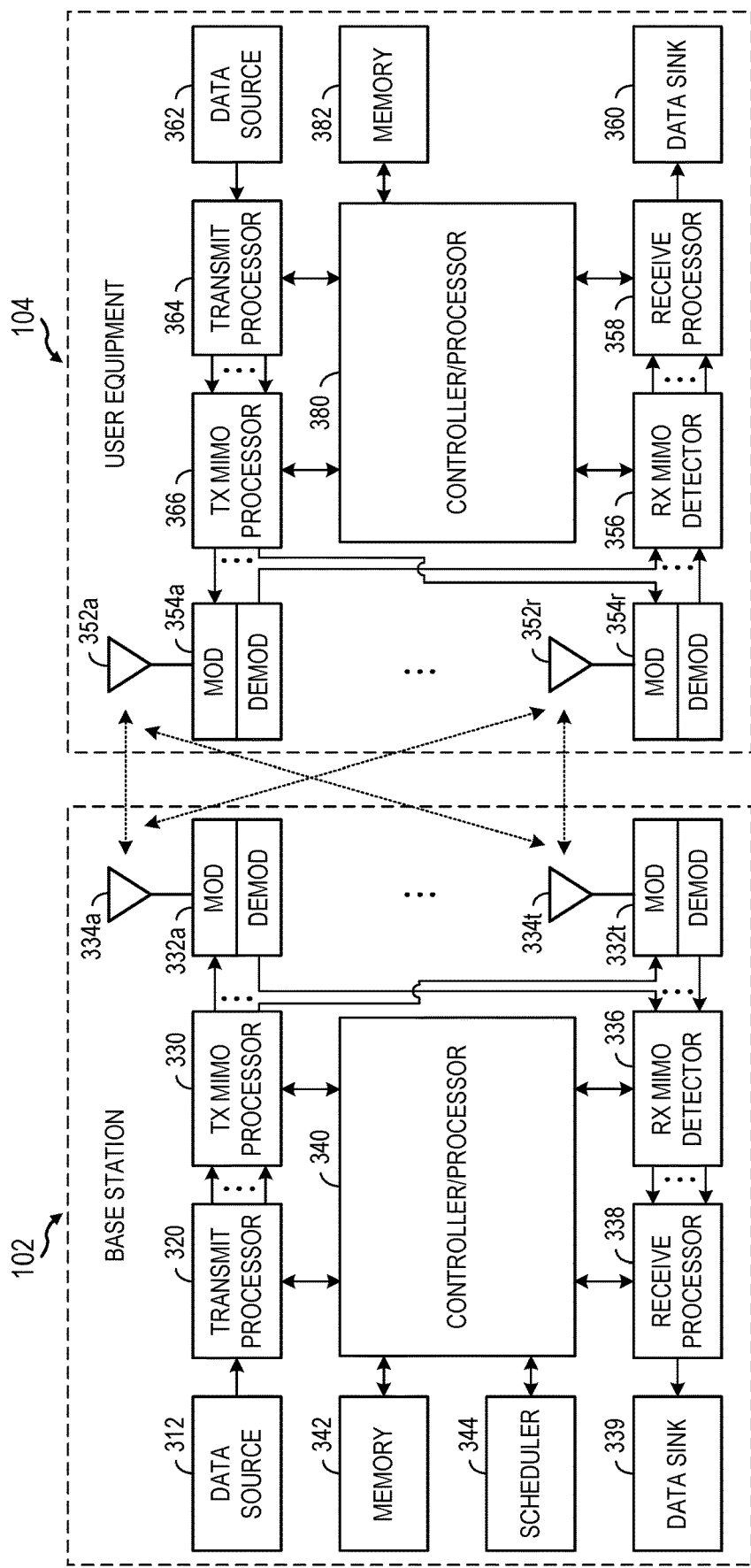
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Multi Antenna Panel and Full Duplex Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 5A:
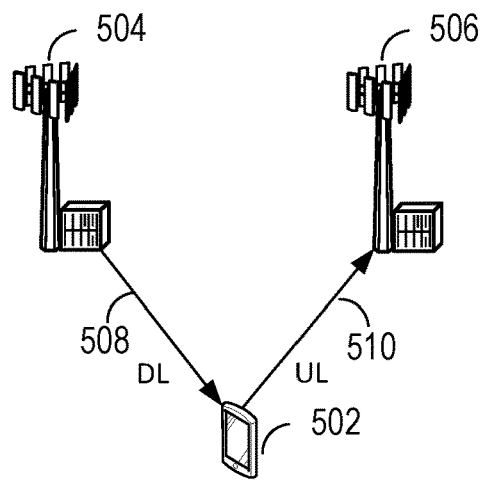
FIGS. 5A, 5B, and 5C illustrates different full-duplex use cases within a wireless communication network.
Figure 5B:
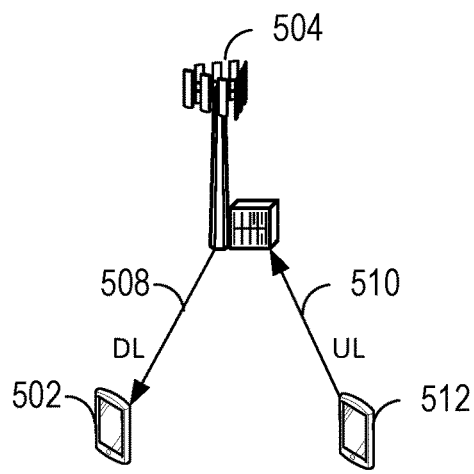
Figure 5C:
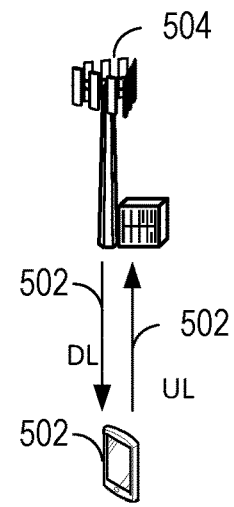

FIGS. 5A, 5B, and 5C illustrates different FD use cases within a wireless communication network, such as the wireless communication network 100. For example, FIG. 5A illustrates a first FD use case involving transmission between one UE 502 and two base stations (or multiple transmission reception points (mTRP)), BS 504 and BS 506. In some cases, UE 502 may be representative of UE 104 of FIG. 1 and BSs 504, 506 may be representative of BS 102 of FIG. 1. As shown, the UE 502 may simultaneously receive DL transmissions 508 from the BS 506 and transmit UL transmissions 510 to the BS 506. In some cases, the DL transmissions 508 and UL transmissions 510 may be performed using different antenna panels to facilitate the simultaneous transmission and reception.

A second FD use case is illustrated in FIG. 5B involving two different UEs and one BS. As illustrated, the UE 502 may receive DL transmissions 508 from the BS 504 while another UE 512 may simultaneously transmit UL transmission 510 to the BS 504. Thus, in this example, BS 504 is conducting simultaneous uplink and downlink communications.

A third FD use case is illustrated in FIG. 5C involving one BS and one UE. As illustrated, the UE 502 may receive DL transmissions 508 from the BS 504 and may simultaneously transmit UL transmissions 510 to the BS 504. As noted above, such simultaneous reception/transmission by the UE 502 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline 5G behavior |
| FD disabled | FD enabled | Use case #1 (FIG. 5A) for mTRP |
| FD enabled | FD disabled | Use case #2 (FIG. 5B) + IAB |
| FD enabled | FD enabled | Use case #3 (FIG. 5C) |

As shown, if FD capability is disabled at both the base station and UE, the baseline 5G behavior may be used (e.g., HD communication). If FD capability is disabled at the BS but enabled at the UE, the UE may operate according to the first example FD use case shown in FIG. 5A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 5B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 5C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

As noted above, FD communication provides for reduced transmission and reception latency and increased spectrum efficiency. However, wireless communications devices that use FD communication may still be susceptible to certain interferences, such as self-interference caused between antenna panels used for uplink and downlink transmissions. More specifically, for example, self-interference may be experienced by a UE when the UE receives its own UL transmission, transmitted using an UL beam of a transmit panel, via a DL beam of a receive panel. Similarly, wireless communications devices that are capable of using FD communication may also be susceptible to interference from neighboring wireless communications devices, known as cross-link interference (CLI).

FIGS. 6A, 6B, 6C, and 6D illustrates different deployment and interference scenarios that may occur within a wireless communications network 600 in which FD and HD communications may be used. In some cases, the wireless communications network 600 may be an example of the wireless communications network 100 of FIG. 1.

As shown, FIG. 6A illustrates a first deployment scenario involving a first network entity 602, a second network entity 604, a first UE 606, a second UE 608, a third UE 610, and a fourth UE 612. In some cases, the first network entity 602 and second network entity 604 may be examples of a base station, such as BS 102 or a disaggregated BS shown and described with respect to FIG. 2. In the example shown in FIG. 6A, the first network entity 602 and second network entity 604 may be communicate using FD communication while the first UE 606, the second UE 608, the third UE 610, and the fourth UE 612 may communicate using HD communication.

For example, as illustrated the first network entity 602 may be capable of receiving UL transmissions from the first UE 606 simultaneously with transmitting DL transmissions to the second UE 608. In some cases, this simultaneous transmission and reception of signals may cause the first network entity 602 to experience self-interference 614. More specifically, for example, the DL transmissions transmitted by the first network entity 602 may cause interference to the UL transmissions being received from the first UE 606. Similarly, DL transmissions by the second network entity 604 to the fourth UE 612 may also cause self-interference 614 to UL transmissions received by the second network entity 604 from the third UE 610.

Moreover, in some cases, the DL transmissions by the second network entity 604 to the fourth UE 612 may also cause CLI 616 to the UL transmissions received by the first network entity 602 from the first UE 606. Similarly, the UL transmissions by the first UE 606 and third UE 610 may cause CLI 616 to the DL transmissions received by the second UE 608 and the fourth UE 612, receptively.

FIG. 6B illustrates a second deployment scenario involving the first network entity 602, the second network entity 604, the first UE 606, and the second UE 608. In some cases, the first UE 606 and/or the second UE 608 may be an example of a customer premise equipment (CPE) (e.g., a 5G NR connection hub). In this example, the first network entity 602 and first UE 606 may communicate with each other using FD communication while the second UE 608 may communicate with the first network entity using FD communication. Accordingly, in some cases, UL transmissions transmitted by the first UE 606 may cause self-interference 614 to DL transmissions received by the first UE 606 from the first network entity 602. Similarly, DL transmissions transmitted by the first network entity 602 may cause self-interference 614 to UL transmissions received by the first network entity 602 from the first UE 606. Additionally, as shown, the UL transmissions transmitted by the first UE 606 may cause CLI 616 to DL transmissions received by the second UE 608 from the first network entity 602. Similarly, downlink transmissions from the second network entity 604 may cause CLI 616 to UL transmissions received by the first network entity 602.

FIG. 6C illustrates a third deployment scenario involving the first network entity 602, the second network entity 604, the first UE 606, and the second UE 608. In some cases, the first UE 606 and/or the second UE 608 may be an example of a CPE. As sown, the third deployment scenario may be an example of multiple transmission reception point (TRP) operation in which the first UE 606 communicates using FD communication with the first network entity 602 (e.g., a first TRP) and the second network entity 604 (e.g., a second TRP). Conversely, as shown, the second UE 608 may communicate only with the second network entity 604 using HD communication.

For example, as shown, the first UE 606 may transmit UL transmissions to the first network entity 602 while simultaneously receiving downlink transmissions from the second network entity 604. As shown, the UL transmissions transmitted by the first UE 606 to the first network entity may cause self-interference 614 to the DL transmissions received from the second network entity 604. Additionally, as shown, the UL transmissions by the first UE 606 may cause CLI 616 to DL transmissions received by the second UE 608 from the second network entity 604. Similarly, the DL transmissions by the second network entity 604 may cause CLI 616 to the UL transmissions received by the first network entity 602.

FIG. 6C illustrates a fourth deployment scenario involving an integrated access and backhaul (IAB) network that includes a parent IAB node 650, a first child IAB node 652, and a second child IAB node 654. As shown, the first child IAB node 652 may communicate with the first UE 606 and the second UE 608 while the second child IAB node 654 may communicate with the third UE 610 and the fourth UE 612. Further, as shown, the first child IAB node 652 and the second child IAB node 654 may receive transmissions from the parent IAB node 650, in some cases, simultaneously with communicating with the first UE 606, the second UE 608, the third UE 610, and the fourth UE 612. In such cases, this simultaneous communication may cause self-interference 614 to be experienced by both the first child IAB node 652 and the second child IAB node 654. Additionally, as shown, transmissions to the third UE 610 by the second child IAB node 654 may cause CLI 616 to UL transmissions received by the first child IAB node 652.

Aspects Related to Autonomous Self-Interference Measurements

Self-interference experienced by a UE performing FD communication, as described above, may be disadvantageous and lead to DL transmissions from a network entity not being received correctly. For example, as noted above, the UE may experience self-interference when the UE receives its own UL transmission, transmitted using an UL beam of a transmit panel, via a DL beam of a receive panel. In some cases, the UE may be able to reduce self-interference by measuring the self-interference and using the self-interference measurements to perform adjust certain parameters associated with UL transmissions, such as adjusting a time or frequency at which the UL transmissions are transmitted or adjusting an UL transmit beam used to transmit the UL transmissions, such that the UL transmissions minimally interfere with DL transmissions received from the network entity. In some cases, the UE may transmit a self-interference report to a network entity indicating the self-interference measurements. In this case, the network entity may use the self-interference measurements to adjust the certain parameters (e.g., time, frequency, beam, etc. for transmitting the UL transmissions) and may provide the adjusted parameters to the UE.

In some cases, to perform the self-interference measurements, the UE may use dedicated resources and signals within a wireless communication network configured specifically for self-interference measurements. These dedicated resources, however, consume time-frequency resources within the wireless communication network as well as power resources at the UE. Additionally, these dedicated resources may need to be configured by the network entity, consuming additional power resources at the network entity and time-frequency resources within the wireless communication network for transmitting this configuration information.

Accordingly, aspects of the present disclosure provide techniques to allow the UE to perform autonomous self-interference measurements using previously-scheduled UL transmissions, such as sounding reference signals (SRSs), demodulation reference signals (DMRSs), physical uplink control channel (PUCCH) transmissions, and/or physical uplink shared channel (PUSCH) transmissions. By allowing the UE to perform the self-interference measurements autonomously (e.g., without significant coordination with the network entity), the consumption of power resources at the network entity and time-frequency resources in the wireless communication network needed to configure the self-interference measurements may be reduced. Moreover, allowing the UE to "re-use" already/previously-scheduled UL transmissions to perform the self-interference measurements eliminates the need for the dedicated resources and signals, thereby reducing time-frequency resources consumption within the wireless communication network as well as power resources at the UE as compared to traditional techniques for performing self-interference measurements that required the use of the dedicated resources and signals. Additional details regarding autonomous self-interference measurements are described below.

Example Operations of Entities in a Communications Network

Figure 7:
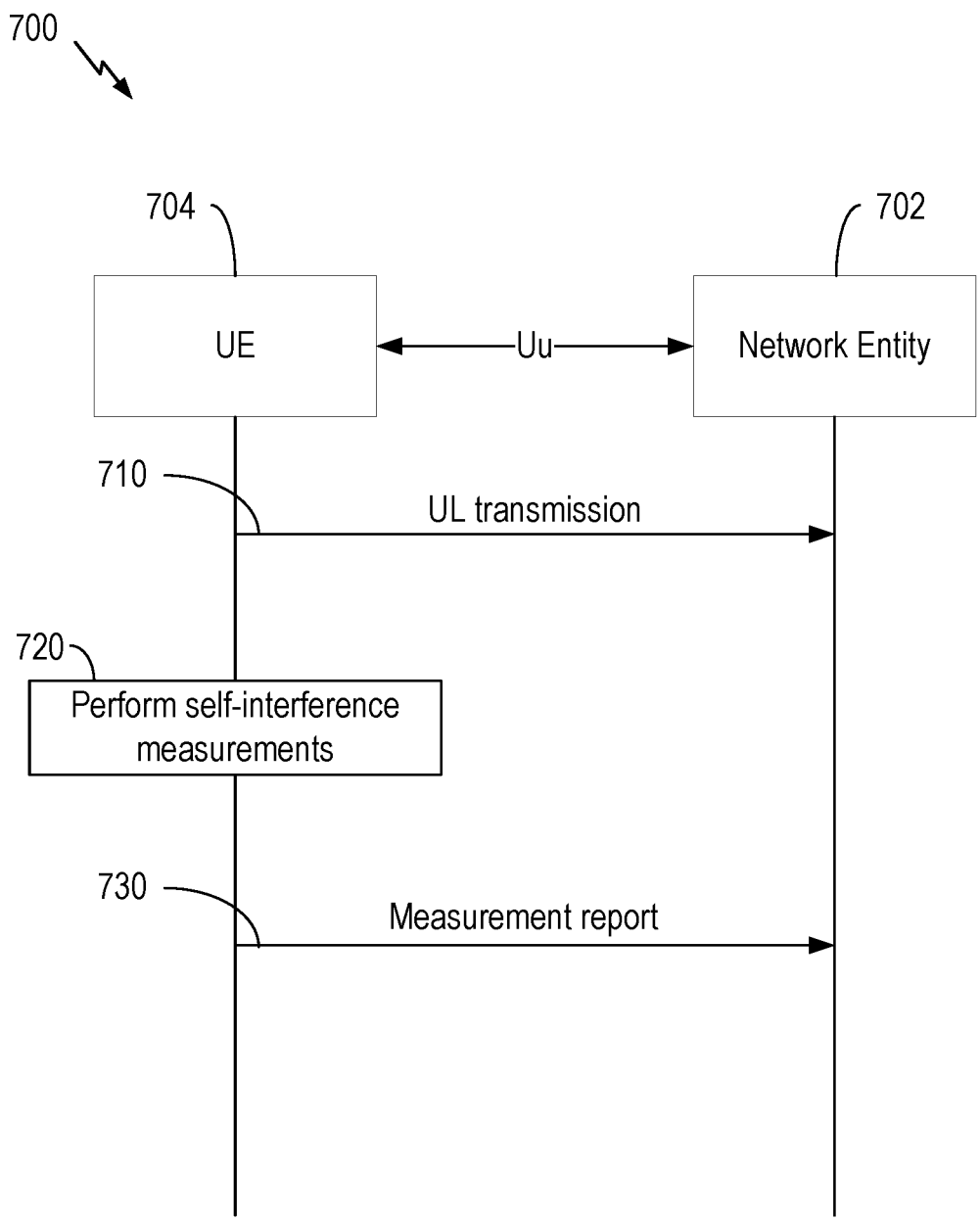
FIG. 7 depicts a process flow for communications in a network between network entity and a user equipment.

FIG. 7 depicts a process flow illustrating operations 700 for communications in a network between a network entity 702 and a UE 704. In some aspects, the network entity 702 may be an example of the BS 102 depicted and described with respect to FIGS. 1 and 3 or a disaggregated base station depicted and described with respect to FIG. 2. Similarly, the UE 704 may be an example of UE 104 depicted and described with respect to FIGS. 1 and 3. In some cases, the UE 704 may be capable of FD communication with the network entity 702. In some cases, the UE 704 may communicate using FD communication with the network entity 702 (e.g., a first TRP) and a second network entity (e.g., a second TRP). In some cases, UE 104 may be another type of wireless communications device and BS 102 may be another type of network entity or network node, such as those described herein.

As shown, operations 700 begin in step 710 with the UE 704 transmitting at least one UL transmission to the network entity 702 using at least one UL transmit beam. In some cases, the UL transmission may be transmitted in HD resources. In some cases, the at least one UL transmission may comprises one of an SRS, a DMRS, a PUCCH transmission, or a PUSCH transmission. In some cases, the at least one UL transmission may a previously scheduled or on-going transmission that carries information intended for use by the network entity 702. In some cases, the network entity 702 may receive the at least one UL transmission using an UL receive beam.

Thereafter, as shown in step 720, the UE 704 performs self-interference measurements using at least one DL receive beam to measure, for full duplex operation, self-interference associated with the at least one UL transmission transmitted using the at least one UL transmit beam.

Thereafter, in step 730, the UE 704 transmits a measurement report to the network entity 702 indicating the measured self-interference associated with the at least one UL transmission transmitted using the at least one UL transmit beam.

Figure 8:
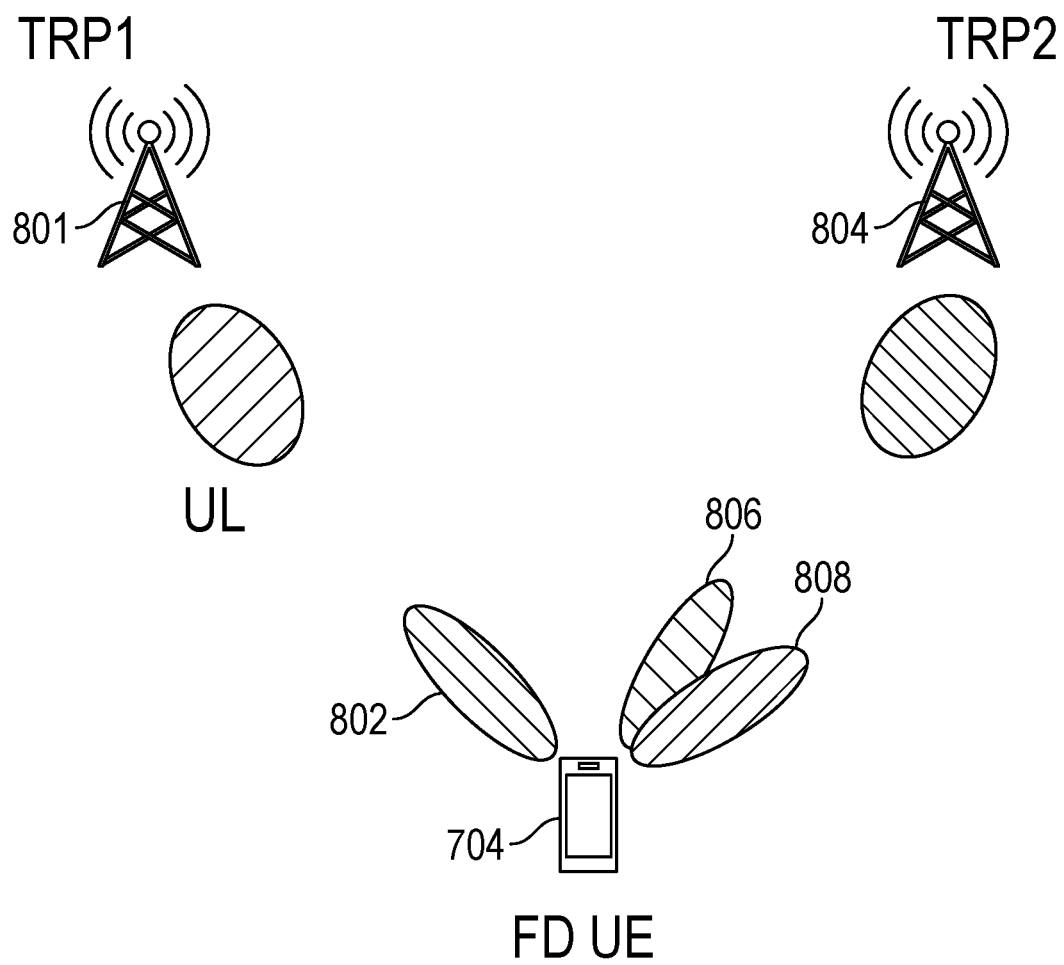
FIG. 8 illustrates selecting a downlink receive beam for performing self-interference measurements.

Aspects Related to Selecting a DL Receive Beam for the Self-Interference Measurements As noted above, the UE 704 may perform the self-interference measurements using at least one DL receive beam. In some cases, however, the UE 704 may have a plurality of different DL receive beams that may be used. For example, as shown in FIG. 8, the UE 704 may communicate (e.g., transmit the at least one UL transmission) with a first TRP 801 using the UL transmit beam 802 and may communicate with a second TRP 804 using a plurality of DL receive beams, such as a first DL receive beam 806 and a second DL receive beam 808. As such, the UE 704 may be configured to select at least one of the first DL receive beam 806 or the second DL receive beam 808 to use to perform the self-interference measurements.

In some cases, the UE 704 may select the at least one DL receive beam to use to measure the self-interference from the plurality of different DL receive beams based on one or more rules. For example, in some cases, the UE 704 may use all DL beams having an active TCI state. In other words, the one or more rules may specify to select, as the at least one DL receive beam for performing the self-interference measurements, all DL receive beams of the plurality of different DL receive beams having an active TCI state.

In some cases, the UE 704 may be configured to use DL receive beam associated with a latest (e.g., most recently used) PDCCH or PDSCH active TCI state(s). In other words, the one or more rules may specify to select, as the at least one DL receive beam for performing the self-interference measurements, one or more DL receive beams of the plurality of different DL receive beams associated with one or more active TCI state of a most-recently received PDCCH or PDSCH.

In some cases, when there are two active TCI states, the UE 5704 may select one TCI state to measure or pick both to measure simultaneously per PUSCH occasion (e.g. two active TCI states on two different UE DL antenna panels from an UL antenna panel used to transmit the at least one UL transmission). For example, in some cases, based on the one or more rules, the UE 704 may select two or more DL receive beams associated with different TCI states as the at least one DL receive beam to perform the self-interference measurements. In this case, to perform the self-interference measurements using at least one DL receive beam, the UE 704 may use a first DL receive beam on a first DL antenna panel to measure the self-interference, associated with a first UL transmission, for a first TCI state of the different TCI states. Additionally, the UE 704 may use a second DL receive beam on a second DL antenna panel to measure the self-interference, associated with a second UL transmission, for a second TCI state of the different TCI states.

In some cases, the one or more rules may specify to select, as the at least one DL receive beam, one or more DL receive beams associated with one or more active unified multi-channel TCI states of a latest/most-recently received PDSCH. In some cases, such as for single-TRP (sTRP) (e.g., in which the UE 704 communicates only with one TRP) unified TCI, the UE 704 may be configured to use a single indicated DL only or joint unified TCI state may be used (if feasible, for example, on a different antenna panel than the UL antenna panel). In other words, for sTRP TCI, the one or more active unified multi-channel TCI states comprise a downlink only TCI state or a joint downlink and uplink unified multi-channel TCI state. Accordingly, for sTRP TCI, based on the one or more rules, the UE 704 may select a DL receive beam associated with the downlink only TCI state or the joint downlink and uplink unified multi-channel TCI state.

In the case of multi-TRP (e.g., where the UE 704 communicates with more than one TRP), the UE 704 may select one DL only or joint TCI state to measure or pick both DL only or joint to measure simultaneously (if feasible, on different antenna panels than the UL antenna panel). In other words, for mTRP TCI, the one or more active unified multi-channel TCI states comprise one of a downlink only TCI state, a joint downlink and uplink unified multi-channel TCI state, or both the downlink only TCI state and the joint downlink and uplink unified multi-channel TCI state. Accordingly, for mTRP TCI, based on the one or more rules, the UE 704 may select at least one DL receive beam associated with the downlink only TCI state, the joint downlink and uplink unified multi-channel TCI state, or both the downlink only TCI state and the joint downlink and uplink unified multi-channel TCI state.

In some cases, the UE 704 may be configured to select the downlink only TCI state, the joint downlink and uplink unified multi-channel TCI state, or both the downlink only TCI state and the joint downlink and uplink unified multi-channel TCI state based on an indication received from a network entity. For example, for mTRP unified TCI, the network entity 702 may transmit a flag to the UE 704 that indicates which TCI state to select. In some cases, a first value of the indication (e.g., zero) indicates to select the downlink only TCI state or the joint downlink and uplink unified multi-channel TCI state. In some cases, a second value of the indication (e.g., one) indicates to select both the downlink only TCI state and the joint downlink and uplink unified multi-channel TCI state.

In some cases, the one or more rules may specify to reuse network-entity-configured reference signal (RS) identifiers, such as identifiers of channel state information (CSI) sets, when selecting the at least one DL receive beam. In other words, the one or more rules may specify to select, as the at least one DL receive beam, one or more DL receive beams associated with one or more configured downlink RS IDs.

In some cases, the one or more rules may be a rule fixed within a wireless communication standard. As one example, in some cases, the fixed rule may specify to select, as the at least one DL receive beam, all DL receive beams associated with synchronization signal block (SSB) beam identifiers corresponding to measured RSRP value greater than or equal to a threshold.

Figure 9:
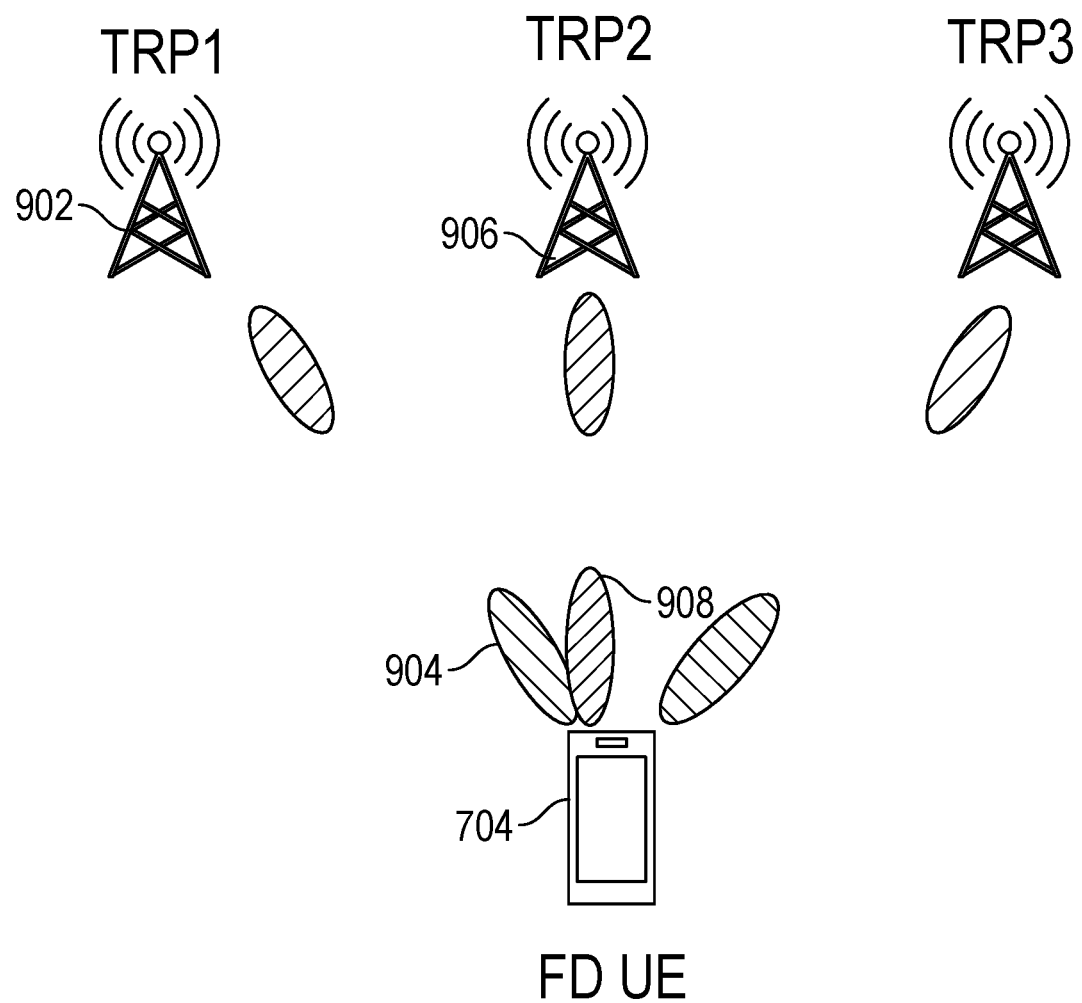
FIG. 9 illustrates selecting an uplink transmit beam for performing self-interference measurements.

Aspects Related to Selecting a UL Transmit Beam for the Self-Interference Measurements As noted above, the UE 704 may transmit at least one UL transmission using at least one UL transmit beam. In some cases, transmitting the at least one UL transmission using the at least one UL transmit beam may comprise simultaneously transmitting a first UL transmission using a first UL transmit beam to a first TRP and transmitting a second UL transmission using a second UL transmit beam to a second TRP. For example, as illustrated in FIG. 9, the UE 704 may use a first UL transmit beam 904 to transmit a first UL transmission to a first TRP 902 and may use a second UL transmit beam 908 to transmit a second UL transmission to a second TRP 906. In some cases, the first UL transmission and the second UL transmission are transmitted simultaneously using spatial division multiplexing. In other cases, the first UL transmission and the second UL transmission may be transmitted simultaneously using frequency division multiplexing. Additionally, as shown in FIG. 9, the UE 704 may communicate with a third TRP using a DL receive beam. Because the UE 704 communicates using at least two UL transmit beams, the UE 704 may be configured to select at least one of the first UL transmit beam 904 or the second UL transmit beam 908 to use to perform the self-interference measurements.

In some cases, for SDMed simultaneous UL transmissions (e.g., the first UL transmission and the second UL transmission are transmitted using SDM) and for single downlink control information (sDCI) based mTRP operation in which one DCI schedules the first UL transmission to the first TRP and the second UL transmission to the second TRP, the UE 704 may select at least one of the first UL transmit beam 904 or the second UL transmit beam 908 to use to measure the self-interference based on signaling from a network entity 702. For example, in some cases, the signaling from the network entity 702 may indicate to select at least one of the first UL transmit beam 904 or the second UL transmit beam 908 using an indication of an uplink only TCI state, a joint downlink and uplink unified multi-channel TCI state, or both an uplink only TCI state and a joint downlink and uplink unified multi-channel TCI state.

In some cases, it may be possible for the UE 704 to measure two SDMed UL transmit beams used for transmitting PUSCH, for example, using different DMRS port groups to measure two different RSRPs associated with the first UL transmission and the second UL transmission. For example, in some cases, the signaling from the network entity 702 may indicate to select both the first UL transmit beam 904 and the second UL transmit beam 908. In this case, performing the self-interference measurements in step 720 may include using a first DMRS port group to measure the self-interference associated with the first UL transmit beam 904 and using a second DMRS port group to measure the self-interference associated with the second UL transmit beam 908.

In some cases, for SDMed simultaneous UL transmissions and for multi DCI (mDCI) based mTRP operation in which multiple DCIs respectively schedule the first UL transmission and second UL transmission to the first TRP and second TRP, the UE 704 may select at least one of the first UL transmit beam 904 or the second UL transmit beam 908 to use to measure the self-interference based on an indication from a network entity 702. For example, the indication from the network entity 702 may indicate a control resource set (COORSET) pool index for the first UL transmit beam 904, the second UL transmit beam 908, or both the first UL transmit beam 904 and the second UL transmit beam 908. For example, a first CORESET pool index (e.g., zero) may indicate to the UE 704 to select the first UL transmission and first UL transmit beam 904 while a second CORESET pool index (e.g., one) may indicate to the UE 704 to select the second UL transmission and second UL transmit beam 908.

In some cases, for SDMed simultaneous UL transmissions, the UE 704 may be configured to autonomously measure and report the self-interference within the measurement report per TRP and per UL transmit beam. In such cases, the TRP (e.g., an UL transmit beam) may be identified in the measurement report by a TCI state in case of sDCI based mTRP or per CORESET pool index in case of mDCI based mTRP.

In some cases, for FDMed simultaneous UL transmissions (e.g., the first UL transmission and the second UL transmission are transmitted using FDM), the UE 704 may select at least one of the first UL transmit beam 904 or the second UL transmit beam 908 to use to measure the self-interference is based on a lowest resource block (RB) index allocation associated with the first UL transmit beam 904 or the second UL transmit beam 908. In other cases, for FDMed simultaneous UL transmissions, the UE 704 may select at least one of the first UL transmit beam 904 or the second UL transmit beam 908 to use to measure the self-interference based on signaling from a network entity indicating which of the first UL transmit beam 904 or the second UL transmit beam 908 to use to perform the self-interference measurements.

In some cases, timing between when the at least one UL transmission is transmitted and when the at least one DL receive beam is used to perform the self-interference measurements may need to be taken into account for autonomous self-interference measurement since the network entity 702 may not configure measurement resources for the UE 704. Accordingly, in some cases, one or more timing schemes may be defined for performing the self-interference measurements. In such cases, the UE 704 may be configured to perform the self-interference measurements in step 720 of FIG. 7 based on the one or more timing schemes.

In some cases, for network entity-configured (e.g., event triggered) reporting (e.g., in which the network entity 702 configures the UE 704 with trigger conditions for transmitting the measurement report), the network entity 702 may configure a timing scheme to use. More specifically, for example, the UE 704 may receive configuration information from the network entity 702 configuring the UE 704 to perform the self-interference measurements and to transmit the measurement report. In some cases, the configuration information may configure the UE 704 with certain triggering conditions for performing the self-interference measurements. Upon satisfaction of a triggering condition, the UE 704 may perform the self-interference measurements and transmit the measurement report to the network entity 702. In some cases, in addition to configuring the UE 704 to perform the self-interference measurements, the configuration information received from the network entity 702 may indicate the one or more timing schemes to use to measure the self-interference.

In some cases, the UE 704 may be configured to autonomously transmit the measurement report to the network entity 702, indicating the measured self-interference per timing scheme or indicating which timing scheme was used. Accordingly, in some cases, transmitting the measurement report indicating the measured self-interference to the network entity 702 in step 730 of FIG. 7 may include transmitting the measurement report indicating the measured self-interference for each timing scheme of the one or more timing schemes. In other cases, the UE 704 may select one timing scheme of the one or more timing schemes to perform the self-interference measurements and may indicate, in the measurement report, the one timing scheme selected to perform the self-interference measurements.

Aspects Related to Timing Schemes for Performing Self-Interference Measurements

In some cases, the one or more timing schemes to use to perform the self-interference measurements may be defined within a wireless communication standard.

Figure 10:
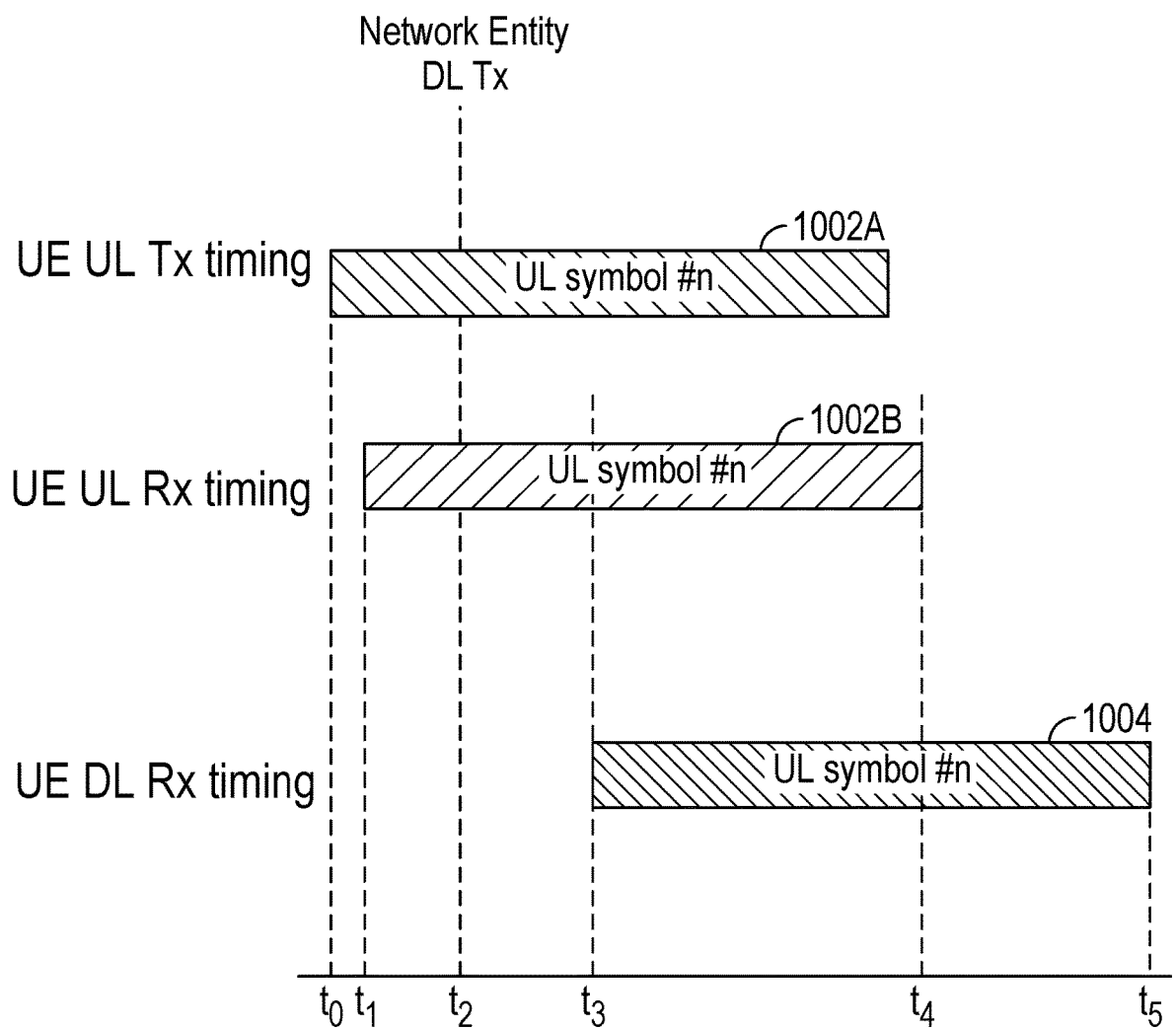
FIG. 10 illustrates a first timing scheme for performing self-interference measurements.

FIG. 10 illustrates a first timing scheme that may be used by the UE 704 to perform the self-interference measurements. As shown in FIG. 10, the first timing scheme may configures the UE 704 to perform the self-interference measurements based on a scheduled time for receiving a DL transmission from the network entity 702 using the at least one DL receive beam. In some cases, the scheduled time for receiving the DL transmission may comprise a monitoring occasion in which the UE 704 is configured to monitor for the DL transmission from the network entity 702. In some cases, the DL transmission may or may not actually be transmitted within the scheduled time/monitoring occasion.

For example, as shown in FIG. 10, the UE 704 may begin transmitting at least one UL transmission 1002A (e.g., an UL symbol) at time $t_0$ using the at least one UL transmit beam. Thereafter, at time $t_1$, the UE 704 receives UL transmission 1002B, using the at least one DL receive beam, corresponding to the UL transmission 1002A transmitted using the at least one UL transmit beam. In some cases, times $t_0$ and $t_1$ may be essentially the same since the at least one UL beam and at least one DL beam are located very close together at the UE 704. In other cases, as shown, there may be a very small propagation delay between times $t_0$ and $t_1$ (e.g., due to the at least one UL transmission being reflected back to the UE 704 by a device such as a reflector).

As shown at time $t_2$ in FIG. 10, the network entity 702 transmits at least one DL transmission 1004 (e.g., a DL symbol) to the UE 704. In some cases, the UE 704 may be configured with a scheduled time for receiving the DL transmission 1004 from the network entity 702 using the at least one DL receive beam. As shown, the scheduled time for receiving the DL transmission 1004 starts at time $t_3$ and extends to time $t_5$. Accordingly, based on the first timing scheme, the UE 704 may begin performing the self-interference measurements based on the starting time for receiving the DL transmission 1004 (e.g., time $t_3$). In some cases, the UE 704 may be configured to stop performing the self-interference measurements at time $t_4$ corresponding to when the UL transmission 1002B is finished being received by (or interfering with) the at least one DL receive beam.

Further, as can be seen in FIG. 10, the scheduled time for receiving the DL transmission 1004 (e.g., time $t_3$) does not align with a scheduled time for receiving the at least one UL transmission (e.g., $t_0$ or $t_1$) using the at least one DL receive beam, resulting in the DL transmission 1004 only partially overlapping with the UL transmission 1002B received using the at least one DL receive beam. As a result, the self-interference measurements performed in step 720 of FIG. 7 and included in the measurement report may comprise wideband or subband signal received strength indicator (RSSI) measurements. In some cases, higher interference may be experienced by the UE 704 on the at least one DL receive beam due to non-orthogonality resulting from the unalignment of the scheduled time for receiving the DL transmission 1004 and the scheduled time for receiving the at least one UL transmission using the at least one DL receive beam.

In some cases, it may be ideal to perform the self-interference measurements without actually receiving the DL transmission 1004 (e.g., without the DL transmission 1004 being transmitted by the network entity 702) and instead simply following the scheduled time for receiving the DL transmission 1004. However, the self-interference measurements may still be performed in the presence of the DL transmission 1004 when the DL transmission 1004 is part of a known DL signal (e.g., reference signal) or the self-interference is measured in a different subband than that in which the DL transmission 1004 is received.

Figure 11:
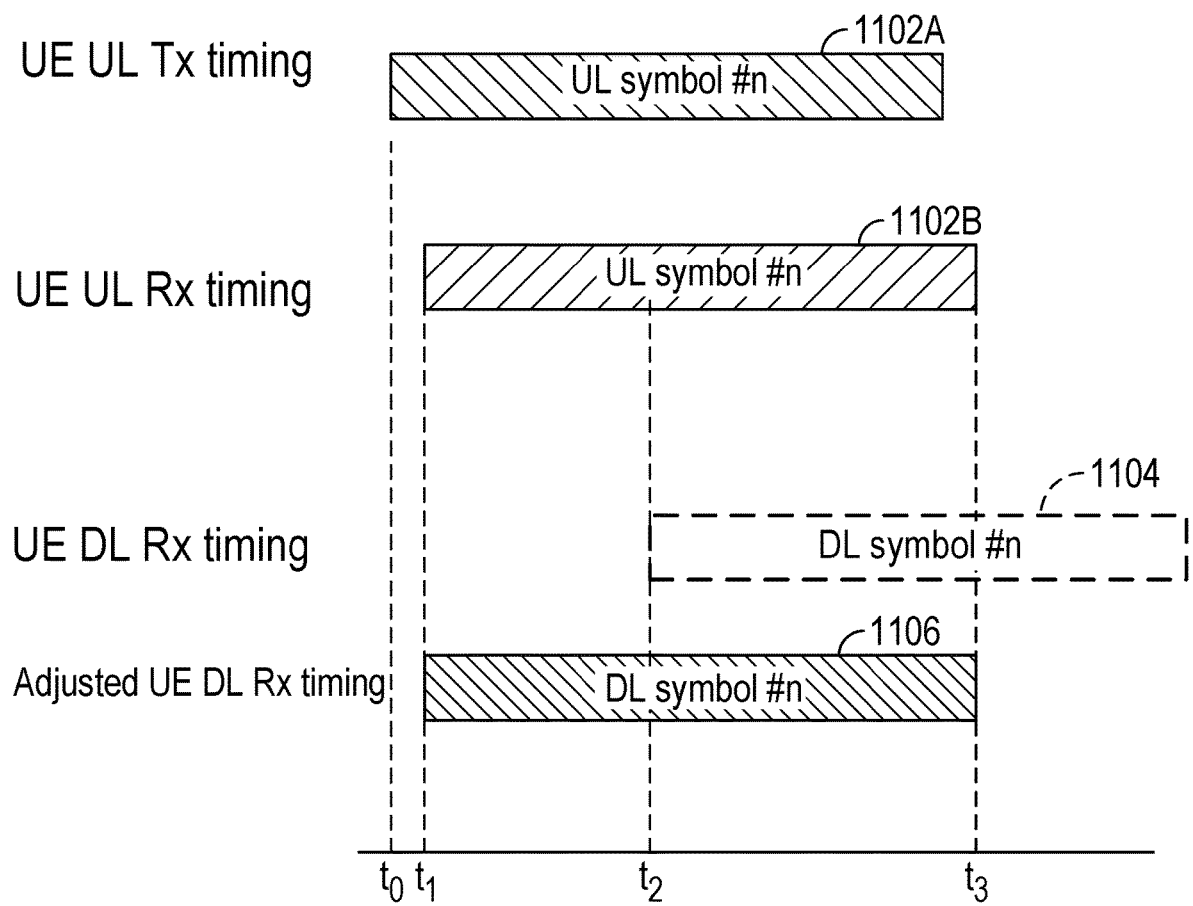
FIG. 11 illustrates a second timing scheme for performing self-interference measurements.

FIG. 11 illustrates a second timing scheme that may be used by the UE 704 to perform the self-interference measurements. In some cases, the second timing scheme may configure the UE 704 to adjust a starting time to perform the self-interference measurements using the at least one DL receive beam according to a scheduled time for receiving the at least one UL transmission using the at least one DL receive beam.

For example, as shown in FIG. 11, the UE 704 may begin transmitting at least one UL transmission 1102A (e.g., an UL symbol) at time $t_0$ using the at least one UL transmit beam. Thereafter, at time $t_1$, the UE 704 receives UL transmission 1102B, using the at least one DL receive beam, corresponding to the UL transmission 1102A transmitted using the at least one UL transmit beam. As noted above, times to and $t_1$ may be essentially the same since the at least one UL beam and at least one DL beam are located very close together at the UE 704. In other cases, as shown, there may be a very small propagation delay between times to and $t_1$ (e.g., due to the at least one UL transmission being reflected back to the UE 704 by a device such as a reflector).

Further, time $t_2$ shown in FIG. 11 is the scheduled time for receiving a DL transmission 1104 (e.g., a DL symbol) from the network entity 702. In some cases, if the UE 704 determines that there is not going to be an overlapping DL transmission transmitted during reception of the UL transmission 1102B (e.g., the DL transmission 1104 is not actually going to be transmitted by the network entity 702), the UE 704 may adjust, according to the second timing scheme, the scheduled time for receiving the DL transmission 1104 such that the starting time to perform the self-interference measurements using the at least one DL receive beam is adjusted according to the scheduled time for receiving the at least one UL transmission using the at least one DL receive beam.

For example, as shown in FIG. 11, when the DL transmission 1104 is not actually going to be transmitted, the scheduled time for receiving the DL transmission 1104 may be adjusted from time $t_2$ to time $t_1$ (or time $t_0$ if time $t_1$ equals time $t_0$), which is the scheduled time for receiving the at least one UL transmission using the at least one DL receive beam. As a result, the UE 704 may also adjust the starting time $t_0$ perform the self-interference measurements using the at least one DL receive beam according to the scheduled time for receiving the at least one UL transmission using the at least one DL receive beam, such that a time period 1106 for performing the self-interference measurements fully overlaps with the reception of the UL transmission 1102B.

To determine whether or not there will be an actual DL transmission transmitted that (at least partially) overlaps the at least one UL transmission, the UE 704 may, in some cases, can determine N slots (e.g., two) prior to the at least one UL transmission (e.g., prior to transmission of a PUSCH symbol used to measure self-interference), whether there is a scheduled monitoring occasion (e.g., scheduled based on a DL dynamic grant) for receiving, for example, a PDCCH or whether there are any pre-scheduled periodic SPS occasions. If the UE 704 determines that there has not been a monitoring occasion (e.g., a scheduled time $t_0$ receive the PDCCH) scheduled or that there are no pre-scheduled periodic SPS occasions, then the UE 704 may conclude that there will not be any DL transmissions transmitted during the at least one UL transmission. In other words, in some cases, the UE 704 may determine a threshold number of slots prior to the at least one UL transmission that a DL transmission is not scheduled to overlap with the at least one UL transmission. In this case, the UE 704 may be allowed to adjust the scheduled time for receiving DL transmissions (as well as the starting time for performing the self-interference measurements) according to the schedule time for receiving the at least one UL transmission using the at least one DL receive beam. In some cases, guard symbols may be needed when adjusting the starting time for performing the self-interference measurements. For example, in some cases, the guard symbols may be configured before and/or after symbols in which the self-interference measurements are performed.

In some cases, the UE 704 may be configured to autonomously adjust the scheduled time for receiving DL transmissions (as well as the starting time for performing the self-interference measurements). In other cases, the UE 704 may transmit a request to the network entity 702, requesting to adjust the scheduled time for receiving the DL transmissions. In some cases, based on the request, the UE 704 may receive a response from the network entity 702 based on the request. The UE 704 may then adjust the scheduled time for receiving DL transmissions (as well as the starting time for performing the self-interference measurements) based on the response message from the network entity 702.

As noted above and as can be seen in FIG. 11, due to the adjusting by the UE 704, the time period 1106 for performing the self-interference measurements may fully overlap with the reception of the UL transmission 1102B. In such cases, based on this overlap, the self-interference measurements included in the measurement report may include wideband or subband RSSI measurements or RSRP measurements.

In some cases, when the UE 704 determines the threshold number of slots prior to the at least one UL transmission that a DL transmission is scheduled to overlap with the at least one UL transmission, the UE 704 may transmit a request to the network entity to change a scheduled time of the DL transmission such that the DL transmission does not overlap with the at least one UL transmission. In such cases, based on the request, the network entity 702 may transmit a response to the UE 704 indicating that no DL transmissions are scheduled during a time window associated with performing the self-interference measurements. In some cases, the time window may align with reception of the at least one UL transmission by the UE 704 using the at least one DL receive beam. Accordingly, based on the request and response from the network entity 702, the UE 704 may adjust the scheduled time for receiving DL transmissions (as well as the starting time for performing the self-interference measurements) using the at least one DL receive beam according to the scheduled time for receiving the at least one UL transmission using the at least one DL receive beam.

In some cases, while performing the self-interference measurements, the UE 704 may receive a DL transmission using the at least one DL beam. In such cases, the UE 704 may performing interference cancellation on the received DL transmission to determine an interference residual corresponding to the self-interference associated with the at least one UL transmission. In some cases, the UE 704 may include this interference residual in the measurement report indicating the measured self-interference.

Aspects Related to the Measurement Report

In some cases, the measurement report transmitted by the UE 704 in step 730 of FIG. 7 may be transmitted in different manners. For example, transmitting the measurement report in step 730 may comprise transmitting the measurement report autonomously without being requested by the network entity 702.

In some cases, transmitting the measurement report in step 730 of FIG. 7 may comprise transmitting a scheduling request to the network entity 702 to request resources for transmitting the measurement report. Thereafter, the UE 704 may receive an uplink grant indicating the resources for transmitting the measurement report. The UE 704 may then transmit the measurement report in step 730 of FIG. 7 using the resources indicated in the grant.

In some cases, transmitting the measurement report in step 730 of FIG. 7 may comprise transmitting the measurement report in a media access control-control element (MAC-CE) using resources allocated in an existing uplink grant. In some cases, transmitting the measurement report in step 730 of FIG. 7 may comprise transmitting the measurement report in preconfigured periodic PUCCH resources.

In some cases, transmitting the measurement report in step 730 of FIG. 7 may comprise transmitting the measurement report based on a trigger condition configured by a network entity. For example, in some cases, the trigger condition comprises a threshold number of UL transmit-DL receive beam pairs (e.g., X transmit+Y receive beam pairs) above a threshold number of beam pairs.

In some cases, the measurement report may include different types of information. In some cases, the network entity 702 may transmit an indication to the UE 704 indicating what information to include within the measurement report. In some cases, a wireless standard may define the information to include within the measurement report, such as what MAC-CE fields to include within the measurement report.

In some cases, the measurement report may include an identifier of the at least one DL receive beam used to perform the self-interference measurements. In some cases, the identifier of the at least DL receive beam may comprise a transmission configuration indication (TCI) associated with the at least one DL receive beam, an RS ID associated with the at least one DL receive beam, an antenna panel ID associated with the at least one DL receive beam. In some cases, when an antenna panel ID is indicated in the measurement report, a UL transmit beam ID and/or UL antenna panel ID may be indicated if multiple UL transmit beams are used to perform the self-interference measurements.

In some cases, the measurement report may include a wideband or subband self-interference metric for each component carrier of a plurality of component carriers associated with the at least one DL receive beam. In other words, the measurement report may comprise a multi-CC report, for example, when the network entity 702 schedules DL and UL on different CCs. In some cases, the wideband/subband self-interference metric may comprise RSSI or RSRP. In some cases, the UE 704 may additionally receive, from the network entity 702, an indication of which subbands, of a plurality of subbands, to perform the self-interference measurements on per component carrier.

In some cases, the measurement report includes a self-interference metric reported per UL transmission of the at least one UL transmission transmitted by the UE 704 on the at least one UL transmit beam. In such cases, the measurement report includes, for each self-interference metric, an indication of the UL transmission of the at least one UL transmission corresponding to that self-interference metric. In some cases, the indication of the UL transmission may comprise at least one of a system subframe number, a slot index, a symbol index, an identifier of the at least one UL transmit beam, or a repetition number associated with the UL transmission. In some cases, the symbol index may be indicated in the measurement report when the at least one UL transmission (e.g., PUSCH) is transmitted with repetition on different symbols within a same slot. In some cases, the identifier of the at least one UL transmit beam may be indicated in the measurement report when the at least one UL transmission is transmitted with repetition and with beam sweeping on different UL transmit beams.

In some cases, when the at least one UL transmission is transmitted with repetition, different UL transmission occasions or repetitions may occupy different frequency resources (e.g., N physical resource blocks (PRBs), which may result in different leakage/interference levels associated with the at least one DL receive beam. Accordingly, in some cases, a wireless communication standard or the network entity 702 may indicate which repetition (e.g., a first repetition, a second repetition) of the at least one UL transmission to report the measured self-interference for in the measurement report.

In some cases, the measurement report may include a statistical-based self-interference metric associated with a plurality of UL transmissions, including the UL transmission, having a same TCI state measured over a time window. In some cases, the UE may obtain an indication of an offset between a slot in which to transmit the measurement report and an ending slot of the time window. In some cases, transmitting the measurement report in step 730 of FIG. 7 may be based on the offset. In some cases, the network entity 702 may transmit the indication of the offset to the UE 704. In some cases, the indication of the offset may be specified in a wireless communication standard. In some cases, the UE 704 may transmit the indication of the offset to the network entity 702.

In some cases, the statistical-based self-interference metric indicated in the measurement report may include at least one of a maximum self-interference metric among the plurality of UL transmissions, a minimum self-interference metric among the plurality of UL transmissions, an average self-interference metric among the plurality of UL transmissions, or a percentage of self-interference metrics associated with the plurality of UL transmissions having the same TCI state measured over the time window.

In some cases, if the plurality of UL transmission transmitted over the time window occupy different numbers of subbands at different frequency locations, the UE 704 may report in the measurement report a statistical-based self-interference metric per subband of the different numbers of subbands, such as an average self-interference metric among the subbands, a minimum self-interference metric among the subbands, a maximum self-interference metric among the subbands, or a threshold percentage of self-interference metrics associated with the subbands.

In some cases, if the plurality of UL transmissions occupy different numbers of resource blocks (RBs) at different frequency locations, the statistical-based self-interference metric comprises an RSRP of a transmission bandwidth associated with the plurality of UL transmissions divided by a total number of RBs of the different number of RBs. In some cases, the UE 704 may indicate, in the measurement report, an average self-interference metric among the different numbers of RBs measured over the time window, a maximum self-interference metric among the different numbers of RBs measured over the time window, a minimum self-interference metric among the different numbers of RBs measured over the time window, or a percentage of self-interference metrics associated with the different numbers of RBs measured over the time window.

In some cases, as noted above, the UE 704 may indicate, in the measurement report, the one or more timing schemes used when performing the self-interference measurements.

Additional Self-Interference Measurement Examples

Figure 12:
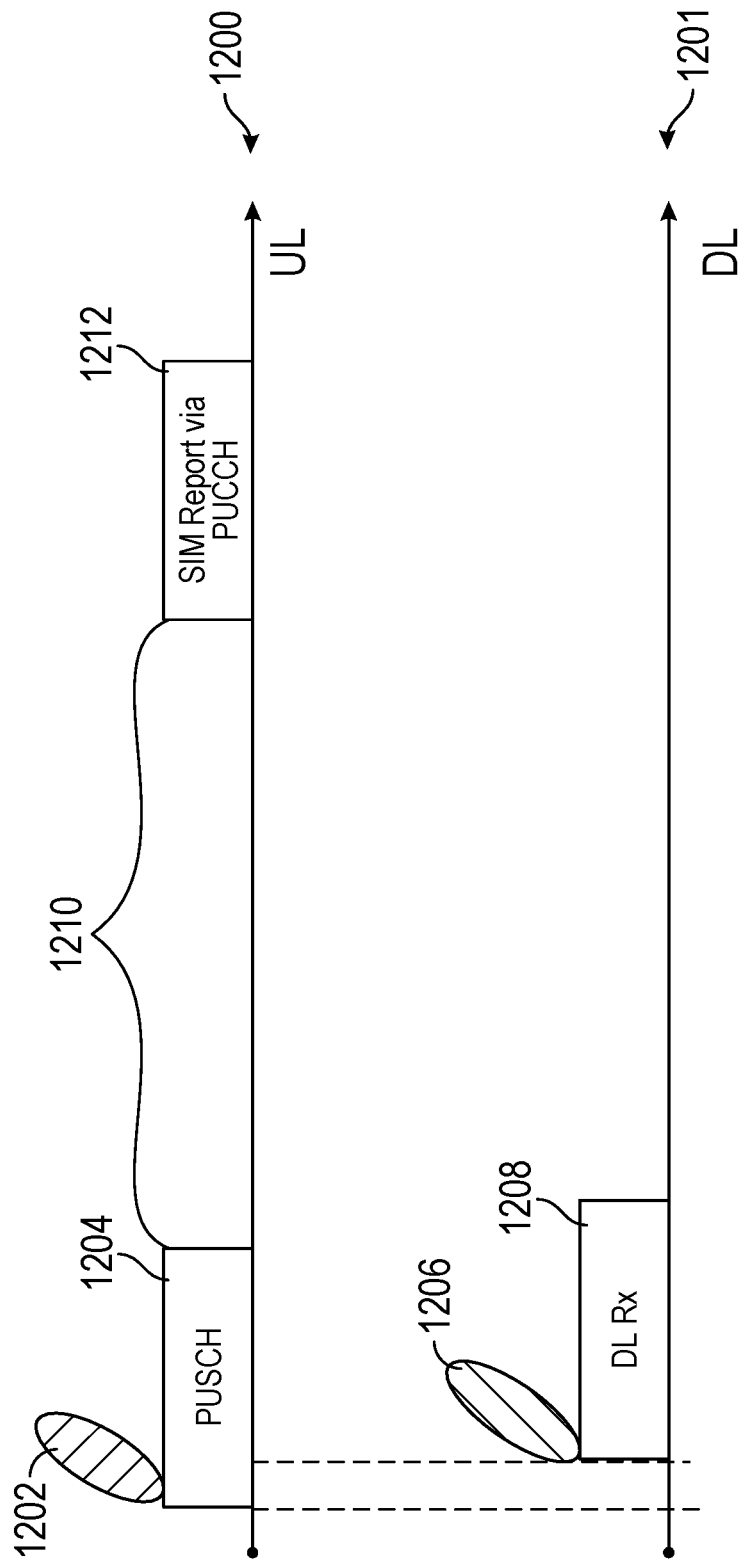
FIGS. 12, 13, and 14 illustrate different examples of a self-interference measurement procedure.

FIG. 12 illustrates a first example of a self-interference measurement procedure performed by the UE 704 to measure self-interference associated with at least one UL transmission. As shown, the self-interference measurement procedure is illustrated using an UL timeline 1200 and a corresponding DL timeline 1201. The example shown in FIG. 12 assumes that self-interference measurements are performed using one UL transmit beam and one DL receive beam and that the self-interference measurements are reported per UL transmission.

As shown in FIG. 12, the UE 704 selects to use one active UL transmit beam to transmit an UL transmission. For example, the UE 704 selects UL transmit beam 1202 to transmit PUSCH 1204. Additionally, as shown, the UE 704 selects one DL receive beam 1206, such as a most recently used DL receive beam used for receiving PDSCH, to perform the self-interference measurements based on the PUSCH 1204. The UE 704 may also determine a timing scheme to use to perform the self-interference measurements using techniques described above. The timing scheme determined by the UE 704 may indicate a starting time for DL reception 1208 and for performing the self-interference measurements. Accordingly, after determining the timing scheme, the UE 704 transmits the PUSCH 1204 using the UL transmit beam 1202 and uses the DL receive beam 1206 to perform the self-interference measurements for the PUSCH 1204 during DL reception 1208 according to the determined timing scheme. The UE 704 may then transmit a self-interference measurement (SIM) report 1212 via PUCCH after a time offset 1210 defining a period of time between the end of the PUSCH 1204 and transmission of the SIM report 1212. In some cases, the UE 704 may indicate the time offset 1210 within the SIM report 1212.

Figure 13:
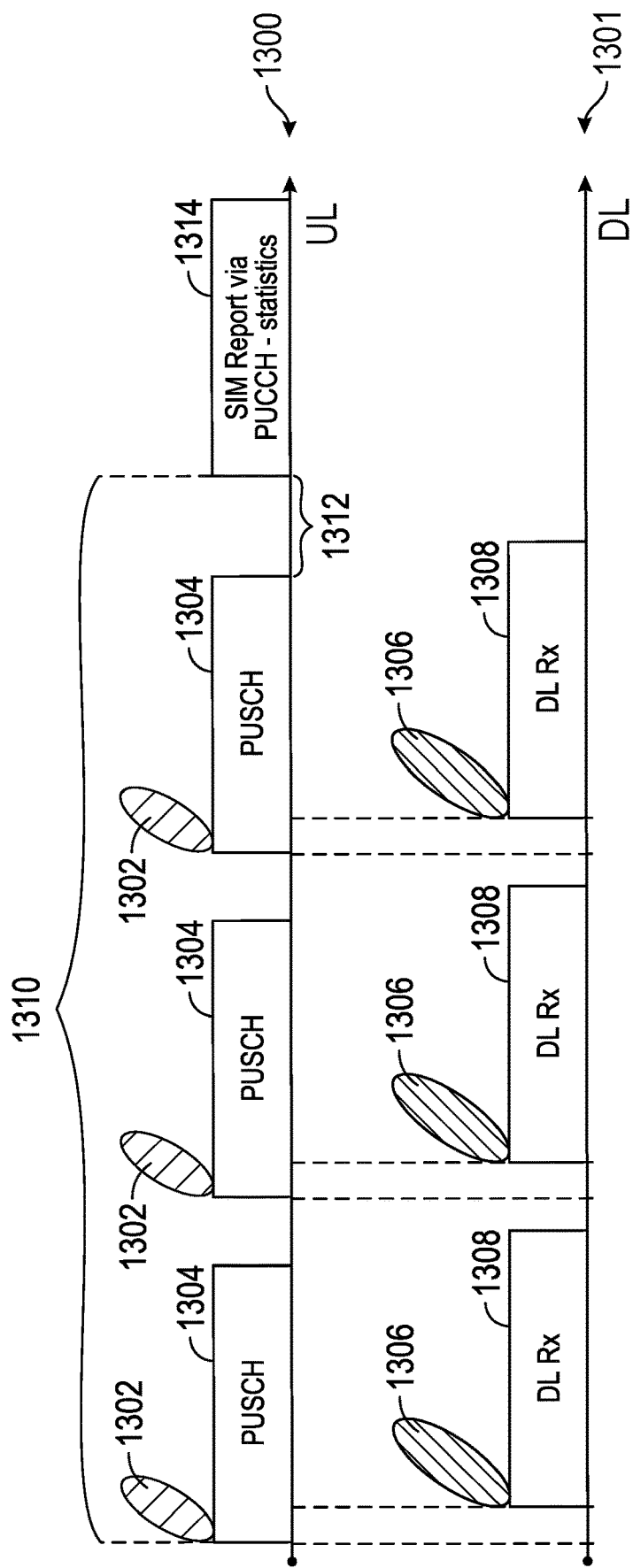

FIG. 13 illustrates a second example of a self-interference measurement procedure performed by the UE 704 to measure self-interference associated with at least one UL transmission. As shown, the self-interference measurement procedure is illustrated using an UL timeline 1300 and a corresponding DL timeline 1301. The example shown in FIG. 13 assumes that self-interference measurements are performed using one UL transmit beam and one DL receive beam and that a plurality of self-interference measurements are performed using the one UL transmit beam and one DL receive beam over a time window.

As shown in FIG. 13, the UE 704 selects to use one active UL transmit beam to transmit an UL transmission. For example, the UE 704 selects UL transmit beam 1302 to transmit PUSCH 1304. Additionally, as shown, the UE 704 selects one DL receive beam 1306, such as a most recently used DL receive beam used for receiving PDSCH, to perform the self-interference measurements based on the PUSCH 1304. The UE 704 may also determine a timing scheme to use to perform the self-interference measurements using techniques described above. The timing scheme determined by the UE 704 may indicate a starting time for DL reception 1308 and for performing the self-interference measurements.

Once the timing scheme has been determined, the UE 704 may then begin transmitting the PUSCH 1304 and performing the self-interference measurements for a plurality of times during a time window. For example, as shown, the UE 704 may transmit the PUSCH 1304 using the UL transmit beam 1302 three time, allowing the UE 704 to perform three self-interference measurements using the DL receive beam during the DL reception 1308 within a time window 1310. The UE 704 may then transmit a SIM report 1314 via PUCCH after a time offset 1312 defining a period of time between the end of the last PUSCH 1304 and transmission of the SIM report 1314. In some cases, the UE 704 may indicate the time offset 1312 within the SIM report 1314. In some cases, in the example shown in FIG. 13, because the UE 704 performs the self-interference measurements for a plurality of UL transmissions, the SIM report 1314 may include statistical-based self-interference metrics for the plurality of UL transmissions, as described above.

Figure 14:
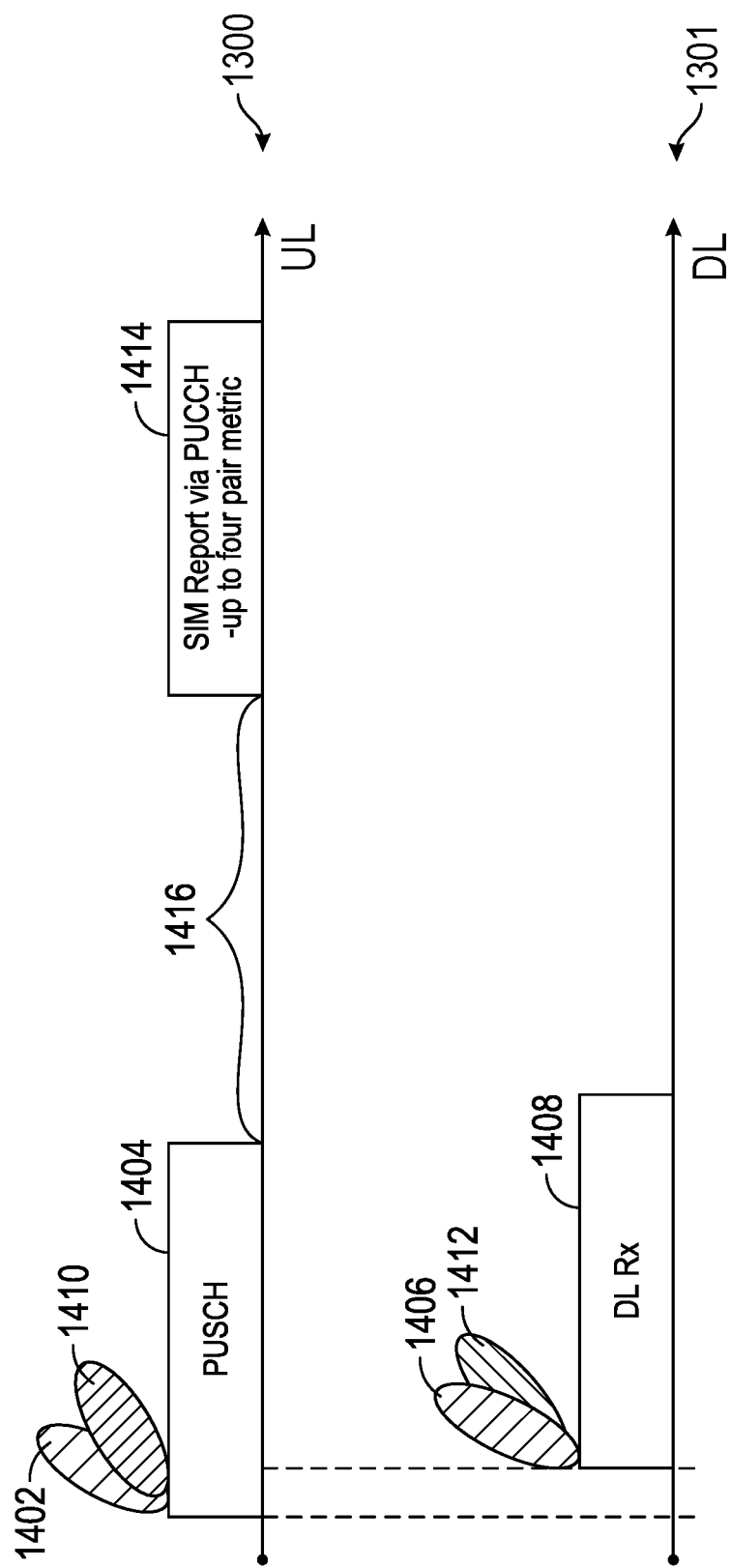

FIG. 14 illustrates a third example of a self-interference measurement procedure performed by the UE 704 to measure self-interference associated with at least one UL transmission. As shown, the self-interference measurement procedure is illustrated using an UL timeline 1400 and a corresponding DL timeline 1401. The example shown in FIG. 14 assumes that self-interference measurements are performed using at least two UL transmit beam-DL receive beam pairs and at least two DL receive beams and that the self-interference measurements are reported per UL transmission. In some cases, each UL transmit beam-DL receive beam pair may include one UL transmit beam and one DL receive beam.

As shown in FIG. 14, the UE 704 selects to use an active UL transmit beam to transmit an UL transmission. For example, the UE 704 selects a first UL transmit beam 1402 to transmit PUSCH 1404. Additionally, as shown, the UE 704 selects a first DL receive beam 1406 to perform the self-interference measurements based on the PUSCH 1404 during DL reception 1408. In some cases, the first DL receive beam 1406 may comprise one of a plurality of most recently used DL receive beams used for receiving PDSCH. In some cases, the first UL transmit beam 1402 and the second DL receive beam 1406 may constitute a first beam pair.

Additionally, as shown, the UE 704 selects to use another active UL transmit beam to transmit the UL transmission. For example, the UE 704 selects a second UL transmit beam 1410 to transmit PUSCH 1404. Additionally, as shown, the UE 704 selects a second DL receive beam 1412 to perform the self-interference measurements based on the PUSCH 1404 during DL reception 1408. In some cases, the second DL receive beam 1412 may comprise another one of the plurality of most recently used DL receive beams used for receiving PDSCH. In some cases, the second UL transmit beam 1410 and the second DL receive beam 1412 may constitute a second beam pair.

The UE 704 may also determine a timing scheme to use to perform the self-interference measurements using techniques described above. The timing scheme determined by the UE 704 may indicate a starting time for DL reception

1408 and for performing the self-interference measurements. Accordingly, after determining the timing scheme, the UE 704 may simultaneously transmit the PUSCH 1204 using the first UL transmit beam 1402 and using the second UL transmit beam 1410. The UE 704 may then simultaneously use the first DL receive beam 1406 and second DL receive beam 1412 to perform the self-interference measurements for the PUSCH 1404 during DL reception 1408 according to the determined timing scheme. The UE 704 may then transmit a SIM report 1414 via PUCCH after a time offset 1416 defining a period of time between the end of the PUSCH 1404 and transmission of the SIM report 1414. In some cases, the UE 704 may indicate the time offset 1416 within the SIM report 1414. In some cases, the SIM report may include up to four different self-interference metrics for PUSCH 1404 associated with the first UL transmit beam 1402, the second UL transmit beam 1410, the first DL receive beam 1406, and the second DL receive beam 1412.

Example Operations of a User Equipment

Figure 15:
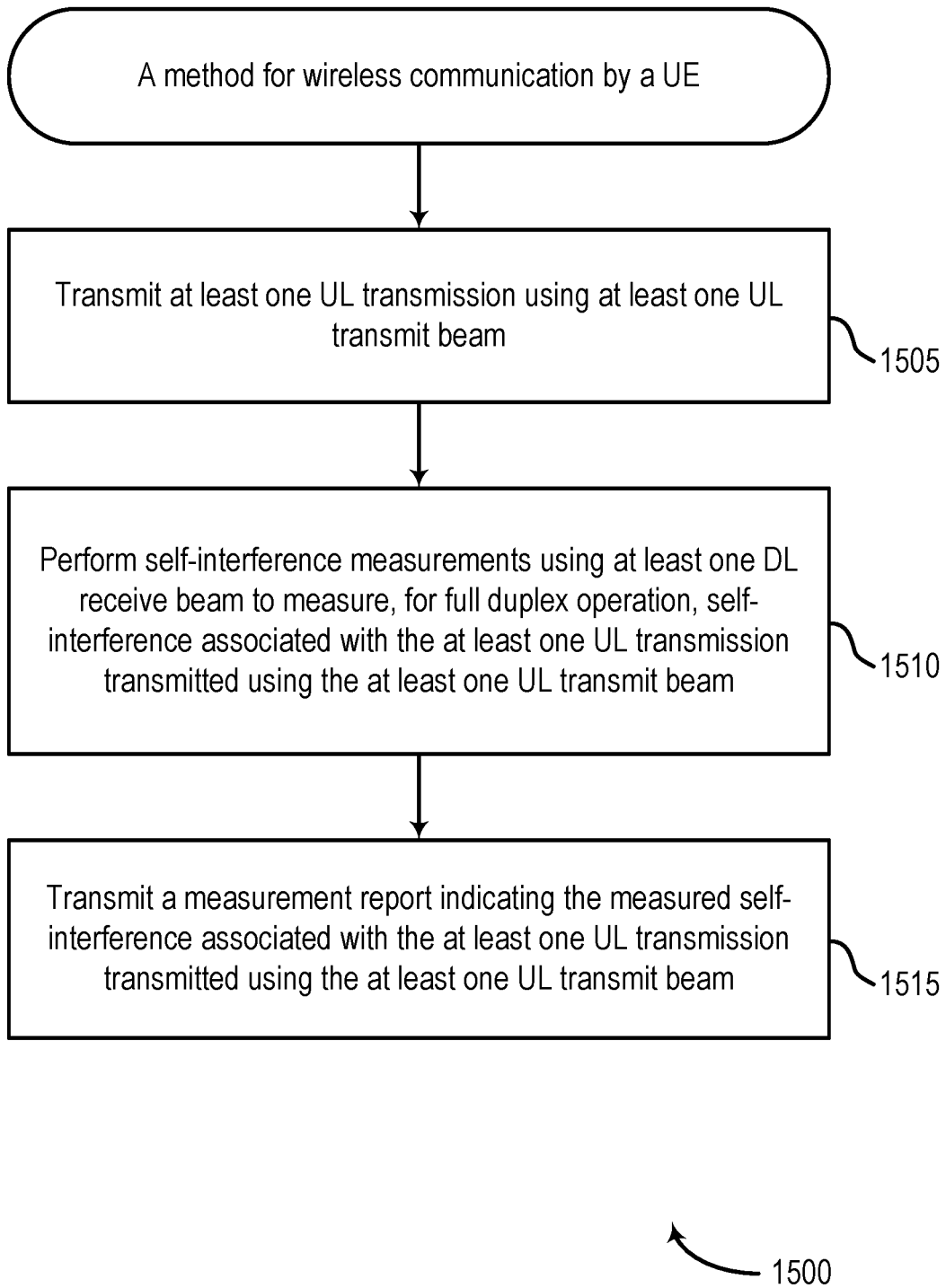
FIG. 15 depicts a method for wireless communications.

FIG. 15 shows an example of a method 1500 for wireless communication by a UE, such as a UE 104 of FIGS. 1 and 3.

Method 1500 begins at step 1505 with transmitting at least one UL transmission using at least one UL transmit beam. In some cases, the operations of this step refer to, or may be performed by, circuitry for transmitting and/or code for transmitting as described with reference to FIG. 17.

Method 1500 then proceeds to step 1510 with performing self-interference measurements using at least one DL receive beam to measure, for full duplex operation, self-interference associated with the at least one UL transmission transmitted using the at least one UL transmit beam. In some cases, the operations of this step refer to, or may be performed by, circuitry for performing and/or code for performing as described with reference to FIG. 17.

Method 1500 then proceeds to step 1515 with transmitting a measurement report indicating the measured self-interference associated with the at least one UL transmission transmitted using the at least one UL transmit beam. In some cases, the operations of this step refer to, or may be performed by, circuitry for transmitting and/or code for transmitting as described with reference to FIG. 17.

In some aspects, the UL transmission comprises one of: a sounding reference signal; a demodulation reference signal; a PUCCH transmission; or a PUSCH transmission.

In some aspects, the method 1500 further includes selecting, based on one or more rules, the at least one DL receive beam to use to measure the self-interference from a plurality of different DL receive beams. In some cases, the operations of this step refer to, or may be performed by, circuitry for selecting and/or code for selecting as described with reference to FIG. 17.

In some aspects, the one or more rules specify to select, as the at least one DL receive beam, all DL receive beams of the plurality of different DL receive beams having an active TCI state.

In some aspects, the one or more rules specify to select, as the at least one DL receive beam, one or more DL receive beams of the plurality of different DL receive beams associated with one or more active TCI states of a received PDCCH or PDSCH.

In some aspects, based on the one or more rules, two or more DL receive beams associated with different TCI states are selected as the at least one DL receive beam; and performing the self-interference measurements using at least one DL receive beam comprises: using a first DL receive beam of the two or more DL receive beams on a first downlink antenna panel to measure the self-interference, associated with a first UL transmission of the at least one UL transmission, for a first TCI state of the different TCI states; and using a second DL receive beam of the two or more DL receive beams on a second downlink antenna panel to measure the self-interference, associated with a second UL transmission of the at least one UL transmission, for a second TCI state of the different TCI states.

In some aspects, the one or more rules specify to select, as the at least one DL receive beam, one or more DL receive beams associated with one or more active unified multi-channel TCI states of a received PDSCH.

In some aspects, for a sTRP TCI, the one or more active unified multi-channel TCI states comprise a downlink only TCI state or a joint downlink and uplink unified multi-channel TCI state.

In some aspects, for mTRP TCI, the one or more active unified multi-channel TCI states comprise one of a downlink only TCI state, a joint downlink and uplink unified multi-channel TCI state, or both the downlink only TCI state and the joint downlink and uplink unified multi-channel TCI state.

In some aspects, the method 1500 further includes selecting the downlink only TCI state, the joint downlink and uplink unified multi-channel TCI state, or both the downlink only TCI state and the joint downlink and uplink unified multi-channel TCI state based on an indication received from a network entity. In some cases, the operations of this step refer to, or may be performed by, circuitry for selecting and/or code for selecting as described with reference to FIG. 17.

In some aspects, a first value of the indication indicates to select the downlink only TCI state or the joint downlink and uplink unified multi-channel TCI state; and a second value of the indication indicates to select both the downlink only TCI state and the joint downlink and uplink unified multi-channel TCI state.

In some aspects, the one or more rules specify to select, as the at least one DL receive beam, one or more DL receive beams associated with one or more configured downlink reference signal identifiers.

In some aspects, the one or more rules specify to select, as the at least one DL receive beam, all DL receive beams associated with SSB beam identifiers corresponding to measured RSRP value greater than or equal to a threshold.

In some aspects, transmitting the at least one UL transmission using the at least one UL transmit beam comprises simultaneously transmitting a first UL transmission using a first UL transmit beam to a first TRP and transmitting a second UL transmission using a second UL transmit beam to a second TRP.

In some aspects, the method 1500 further includes selecting at least one of the first UL transmit beam or the second UL transmit beam to use to measure the self-interference. In some cases, the operations of this step refer to, or may be performed by, circuitry for selecting and/or code for selecting as described with reference to FIG. 17.

In some aspects, the first UL transmission and the second UL transmission are transmitted simultaneously using spatial division multiplexing.

In some aspects, for sDCI based mTRP operation in which one DCI schedules the first UL transmission to the first TRP and the second UL transmission to the second TRP, the selecting at least one of the first UL transmit beam or the second UL transmit beam to use to measure the self-interference is based on signaling from a network entity.

In some aspects, the signaling from the network entity indicates to select at least one of the first UL transmit beam or the second UL transmit beam using an indication of an uplink only TCI state, a joint downlink and uplink unified multi-channel TCI state, or both an uplink only TCI state and a joint downlink and uplink unified multi-channel TCI state.

In some aspects, the signaling from the network entity indicates to select both the first UL transmit beam and the second UL transmit beam; and performing the self-interference measurements comprises: using a first DMRS port group to measure the self-interference associated with the first UL transmit beam; and using a second DMRS port group to measure the self-interference associated with the second UL transmit beam.

In some aspects, for mDCI based mTRP operation in which multiple DCIs respectively schedule the first UL transmission and second UL transmission to the first TRP and second TRP, the selecting at least one of the first UL transmit beam or the second UL transmit beam to use to measure the self-interference is based on an indication from a network entity.

In some aspects, the indication from the network entity indicates a COORSET pool index for the first UL transmit beam, the second UL transmit, or both the first UL transmit beam and the second UL transmit beam.

In some aspects, the first UL transmission and the second UL transmission are transmitted simultaneously using frequency division multiplexing.

In some aspects, the selecting at least one of the first UL transmit beam or the second UL transmit beam to use to measure the self-interference is based on a lowest RB index allocation associated with the first UL transmit beam or the second UL transmit beam.

In some aspects, the selecting at least one of the first UL transmit beam or the second UL transmit beam to use to measure the self-interference is based on signaling from a network entity indicating which of the first UL transmit beam or the second UL transmit beam to use.

In some aspects, performing the self-interference measurements is based on one or more timing schemes.

In some aspects, the method 1500 further includes receiving, from a network entity, configuration information configuring the UE to perform the self-interference measurements and to transmit the measurement report, wherein the configuration information indicates the one or more timing schemes to use to measure the self-interference. In some cases, the operations of this step refer to, or may be performed by, circuitry for receiving and/or code for receiving as described with reference to FIG. 17.

In some aspects, transmitting the measurement report indicating the measured self-interference comprises transmitting the measurement report indicating the measured self-interference for each timing scheme of the one or more timing schemes.

In some aspects, the method 1500 further includes selecting one timing scheme of the one or more timing schemes to perform the self-interference measurements, wherein the measurement report indicates the one timing scheme selected to perform the self-interference measurements. In some cases, the operations of this step refer to, or may be performed by, circuitry for selecting and/or code for selecting as described with reference to FIG. 17.

In some aspects, a first timing scheme of the one or more timing schemes configures the UE to perform the self-interference measurements based on a scheduled time for receiving a DL transmission from a network entity using the at least one DL receive beam.

In some aspects, the scheduled time for receiving the DL transmission does not align with a scheduled time for receiving the at least one UL transmission using the at least one DL receive beam; and the self-interference measurements included in the measurement report comprise wideband or subband RSSI measurements.

In some aspects, a second timing scheme of the one or more timing schemes configures the UE to adjust a starting time $t_0$ perform the self-interference measurements using the at least one DL receive beam according to a scheduled time for receiving the at least one UL transmission using the at least one DL receive beam.

In some aspects, the self-interference measurements included in the measurement report comprise at least one of: wideband or subband RSSI measurements; or RSRP measurements.

In some aspects, the method 1500 further includes determining a threshold number of slots prior to the at least one UL transmission that a DL transmission is not scheduled to overlap with the at least one UL transmission. In some cases, the operations of this step refer to, or may be performed by, circuitry for determining and/or code for determining as described with reference to FIG. 17.

In some aspects, the method 1500 further includes adjusting the starting time to perform the self-interference measurements using the at least one DL receive beam according to the scheduled time for receiving the at least one UL transmission using the at least one DL receive beam based on the determination that the DL transmission is not scheduled to overlap with the at least one UL transmission. In some cases, the operations of this step refer to, or may be performed by, circuitry for adjusting and/or code for adjusting as described with reference to FIG. 17.

In some aspects, the method 1500 further includes determining a threshold number of slots prior to the at least one UL transmission that a DL transmission is scheduled to overlap with the at least one UL transmission. In some cases, the operations of this step refer to, or may be performed by, circuitry for determining and/or code for determining as described with reference to FIG. 17.

In some aspects, the method 1500 further includes transmitting a request to a network entity to change a scheduled time of the DL transmission such that the DL transmission does not overlap with the at least one UL transmission. In some cases, the operations of this step refer to, or may be performed by, circuitry for transmitting and/or code for transmitting as described with reference to FIG. 17.

In some aspects, the method 1500 further includes adjusting the starting time to perform the self-interference measurements using the at least one DL receive beam according to the scheduled time for receiving the at least one UL based on the request transmitted to the network entity. In some cases, the operations of this step refer to, or may be performed by, circuitry for adjusting and/or code for adjusting as described with reference to FIG. 17.

In some aspects, the method 1500 further includes receiving a DL transmission using the at least one DL beam while performing the self-interference measurements. In some cases, the operations of this step refer to, or may be performed by, circuitry for receiving and/or code for receiving as described with reference to FIG. 17.

In some aspects, the method 1500 further includes performing interference cancellation on the received DL transmission to determine an interference residual corresponding to the self-interference associated with the at least one UL transmission, wherein the measurement report indicating the measured self-interference includes the interference residual. In some cases, the operations of this step refer to, or may be performed by, circuitry for performing and/or code for performing as described with reference to FIG. 17.

In some aspects, transmitting the measurement report comprises transmitting the measurement report autonomously without being requested by a network entity.

In some aspects, transmitting the measurement report comprises: transmitting a scheduling request to the network entity to request resources for transmitting the measurement report; receiving an uplink grant indicating the resources for transmitting the measurement report; and transmitting the measurement report using the resources indicated in the grant.

In some aspects, transmitting the measurement report comprises transmitting the measurement report in a MAC-CE using resources allocated in an existing uplink grant.

In some aspects, transmitting the measurement report comprises transmitting the measurement report in preconfigured periodic PUCCH resources.

In some aspects, transmitting the measurement report comprises transmitting the measurement report based on a trigger condition configured by a network entity.

In some aspects, the trigger condition comprises a threshold number of UL transmit-DL receive beam pairs above a threshold.

In some aspects, the measurement report includes at least one of: an identifier of the at least one DL receive beam; an identifier of the at least one UL transmit beam; a TCI state identifier; an antenna panel ID associated with the at least one DL receive beam; or an antenna panel ID associated with the at least one UL transmit beam.

In some aspects, the measurement report includes a wideband or subband self-interference metric for each component carrier of a plurality of component carriers associated with the at least one DL receive beam.

In some aspects, the method 1500 further includes receiving, from a network entity, an indication of which subbands, of a plurality of subbands, to perform the self-interference measurements on per component carrier. In some cases, the operations of this step refer to, or may be performed by, circuitry for receiving and/or code for receiving as described with reference to FIG. 17.

In some aspects, the measurement report includes a self-interference metric reported per UL transmission of the at least one UL transmission.

In some aspects, the measurement report includes, for each self-interference metric, an indication of the UL transmission of the at least one UL transmission corresponding to that self-interference metric; and the indication of the at least one UL transmission comprises at least one of: a system subframe number; a slot index; a symbol index; an identifier of the at least one UL transmit beam; or a repetition number associated with the UL transmission.

In some aspects, the measurement report includes a statistical-based self-interference metric associated with a plurality of UL transmissions, including the UL transmission, having a same TCI state measured over a time window.

In some aspects, the statistical-based self-interference metric comprises at least one of: a maximum self-interference metric among the plurality of UL transmissions; a minimum self-interference metric among the plurality of UL transmissions; an average self-interference metric among the plurality of UL transmissions; or a percentage of self-interference metrics associated with the plurality of UL transmissions.

In some aspects, the method 1500 further includes receiving, from a network entity, an indication of an offset between a slot in which to transmit the measurement report and an ending slot of a time window in which the self-interference measurements are performed, wherein transmitting the measurement report is based on the offset. In some cases, the operations of this step refer to, or may be performed by, circuitry for receiving and/or code for receiving as described with reference to FIG. 17.

In some aspects, the plurality of UL transmissions occupy different numbers of subbands at different frequency locations; and the measurement report includes a statistical-based self-interference metric per subband of the different numbers of subbands.

In some aspects, the plurality of UL transmissions occupy different numbers of RBs at different frequency locations; and the statistical-based self-interference metric comprises a RSRP of a transmission bandwidth associated with the plurality of UL transmissions divided by a total number of RBs of the different number of RBs.

Figure 17:
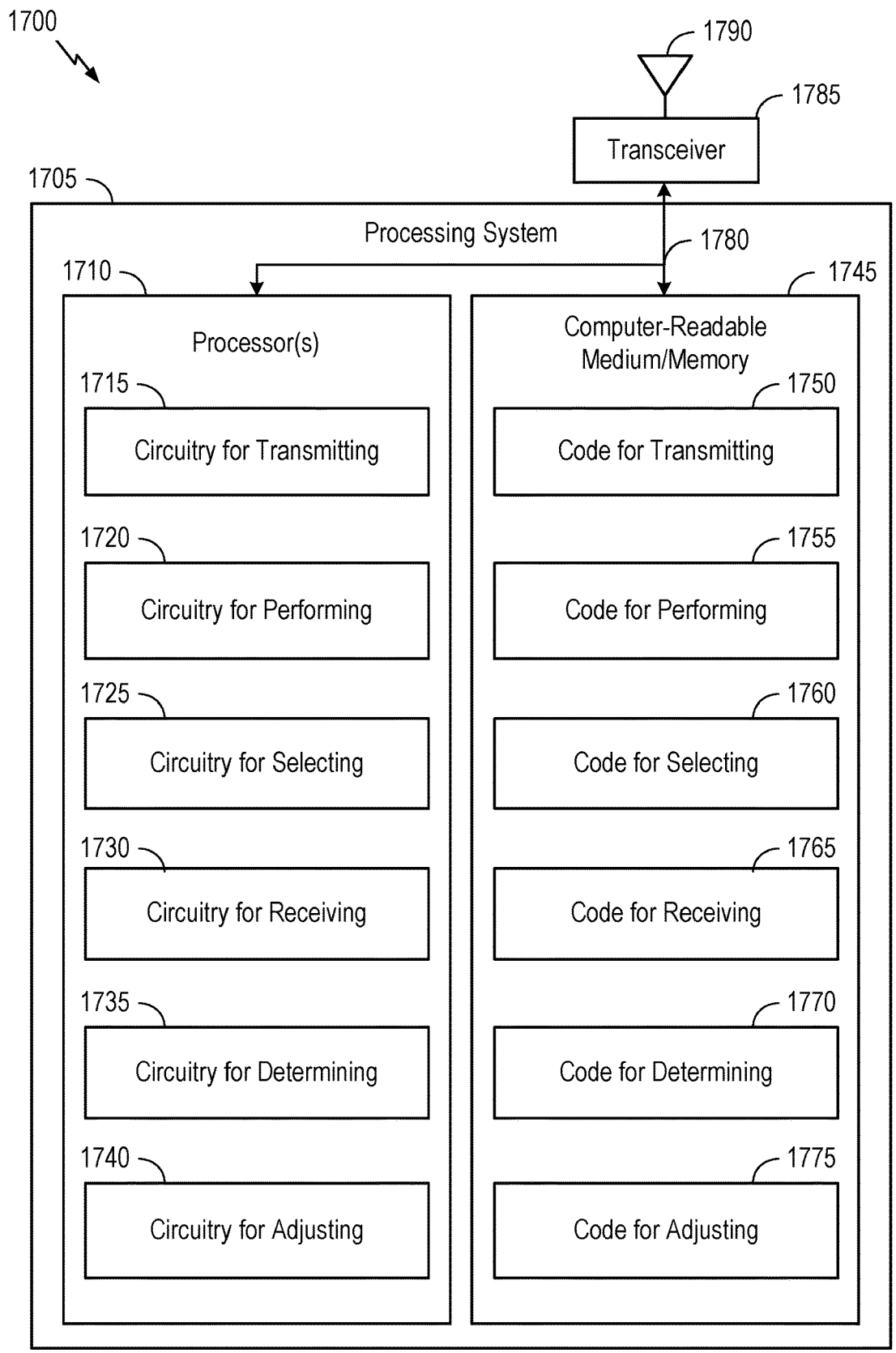
FIG. 17 depicts aspects of an example communications device.

In one aspect, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative steps are possible consistent with this disclosure.

Example Operations of a Network Entity

Figure 16:
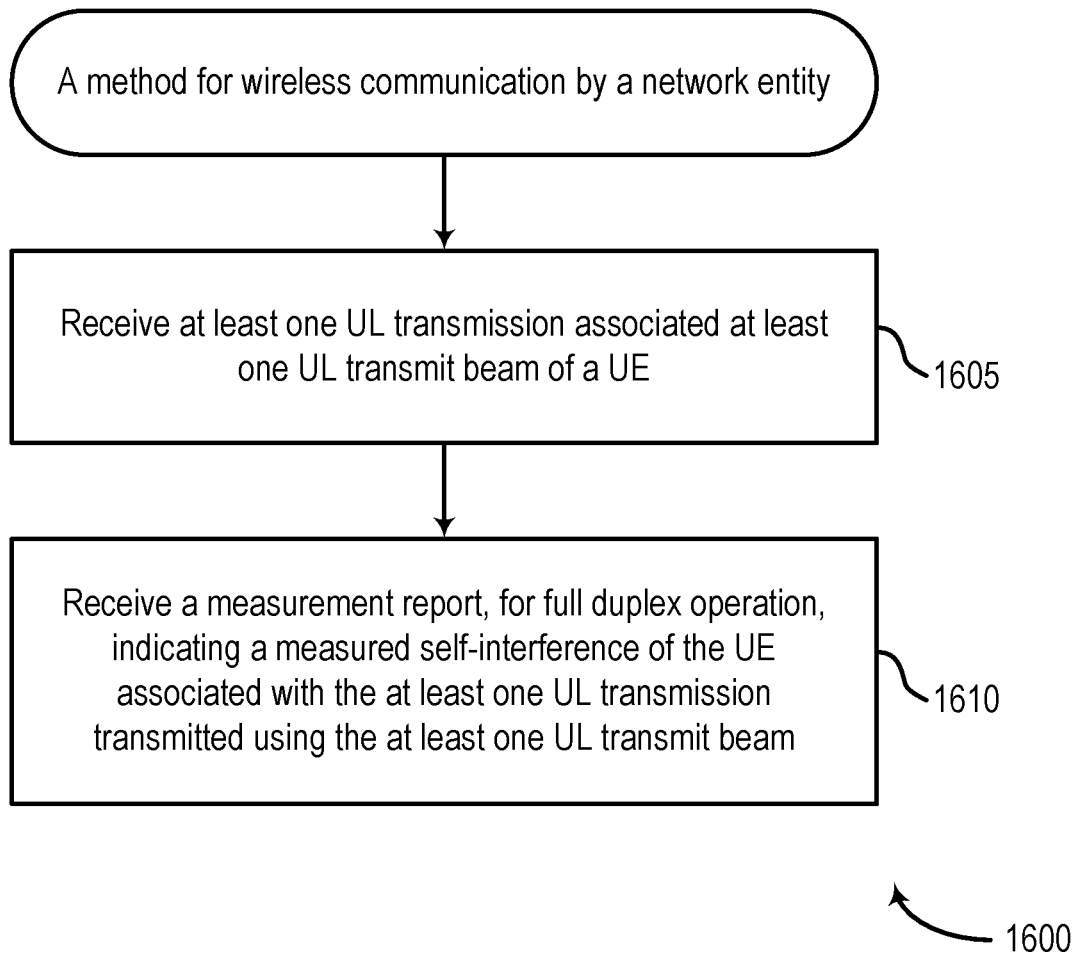
FIG. 16 depicts a method for wireless communications.

FIG. 16 shows an example of a method 1600 for wireless communication by a network entity, such as a BS 102 of FIGS. 1 and 3, or a disaggregated base station as discussed with respect to FIG. 2.

Method 1600 begins at step 1605 with receiving at least one UL transmission associated at least one UL transmit beam of a UE. In some cases, the operations of this step refer to, or may be performed by, circuitry for receiving and/or code for receiving as described with reference to FIG. 18.

Method 1600 then proceeds to step 1610 with receiving a measurement report, for full duplex operation, indicating a measured self-interference of the UE associated with the at least one UL transmission transmitted using the at least one UL transmit beam. In some cases, the operations of this step refer to, or may be performed by, circuitry for receiving and/or code for receiving as described with reference to FIG. 18.

In some aspects, the UL transmission comprises one of: a sounding reference signal; a demodulation reference signal; a PUCCH transmission; or a PUSCH transmission.

In some aspects, the measurement report is based, in part, on one or more active unified multi-channel TCI states of a PDSCH transmitted by the network entity.

In some aspects, for a sTRP TCI, the one or more active unified multi-channel TCI states comprise a downlink only TCI state or a joint downlink and uplink unified multi-channel TCI state.

In some aspects, for mTRP TCI, the one or more active unified multi-channel TCI states comprise one of a downlink only TCI state, a joint downlink and uplink unified multi-channel TCI state, or both the downlink only TCI state and the joint downlink and uplink unified multi-channel TCI state.

In some aspects, the method 1600 further includes transmitting an indication to select, for performing self-interference measurements, the downlink only TCI state, the joint downlink and uplink unified multi-channel TCI state, or both the downlink only TCI state and the joint downlink and uplink unified multi-channel TCI state. In some cases, the operations of this step refer to, or may be performed by, circuitry for transmitting and/or code for transmitting as described with reference to FIG. 18.

In some aspects, a first value of the indication indicates to select the downlink only TCI state or the joint downlink and uplink unified multi-channel TCI state; and a second value of the indication indicates to select both the downlink only TCI state and the joint downlink and uplink unified multi-channel TCI state.

In some aspects, receiving the at least one UL transmission associated with the at least one UL transmit beam comprises simultaneously receiving a first UL transmission using associated with a first UL transmit beam at a first TRP and receiving a second UL transmission associated with a second UL transmit beam at a second TRP.

In some aspects, the first UL transmission and the second UL transmission are received simultaneously using spatial division multiplexing.

In some aspects, the method 1600 further includes, for sDCI based mTRP operation in which one DCI schedules the first UL transmission to the first TRP and the second UL transmission to the second TRP, transmitting signaling indicating to select at least one of the first UL transmit beam or the second UL transmit beam to use to measure the self-interference. In some cases, the operations of this step refer to, or may be performed by, circuitry for transmitting and/or code for transmitting as described with reference to FIG. 18.

In some aspects, the signaling indicates to select at least one of the first UL transmit beam or the second UL transmit beam using an indication of an uplink only TCI state, a joint downlink and uplink unified multi-channel TCI state, or both an uplink only TCI state and a joint downlink and uplink unified multi-channel TCI state.

In some aspects, the signaling indicates to select both the first UL transmit beam and the second UL transmit beam; and the measured self-interference in the measurement report is based on: a first DMRS port group used to measure the self-interference associated with the first UL transmit beam; and a second DMRS port group used to measure the self-interference associated with the second UL transmit beam.

In some aspects, the method 1600 further includes, for mDCI based mTRP operation in which multiple DCIs respectively schedule the first UL transmission and second UL transmission to the first TRP and second TRP, transmitting an indication to select at least one of the first UL transmit beam or the second UL transmit beam to use to measure the self-interference. In some cases, the operations of this step refer to, or may be performed by, circuitry for transmitting and/or code for transmitting as described with reference to FIG. 18.

In some aspects, the indication indicates a COORSET pool index for the first UL transmit beam, the second UL transmit, or both the first UL transmit beam and the second UL transmit beam.

In some aspects, the first UL transmission and the second UL transmission are received simultaneously using frequency division multiplexing.

In some aspects, measured self-interference is in the measurement report is based on a lowest RB index allocation associated with the first UL transmit beam or the second UL transmit beam.

In some aspects, the method 1600 further includes transmitting signaling indicating which of the first UL transmit beam or the second UL transmit beam to use to measure the self-interference. In some cases, the operations of this step refer to, or may be performed by, circuitry for transmitting and/or code for transmitting as described with reference to FIG. 18.

In some aspects, the measured self-interference is based on one or more timing schemes.

In some aspects, the method 1600 further includes transmitting configuration information configuring the UE to: perform self-interference measurements corresponding to the measured-self interference received in the measurement report; and transmit the measurement report, wherein the configuration information indicates the one or more timing schemes to use to measure the self-interference. In some cases, the operations of this step refer to, or may be performed by, circuitry for transmitting and/or code for transmitting as described with reference to FIG. 18.

In some aspects, the measurement report indicates the measured self-interference for each timing scheme of the one or more timing schemes.

In some aspects, the measured self-interference is associated with one timing scheme of the one or more timing schemes, wherein the measurement report indicates the one timing scheme.

In some aspects, a first timing scheme of the one or more timing schemes configures the UE to perform the self-interference measurements based on a scheduled time for receiving a DL transmission from the network entity.

In some aspects, the scheduled time for receiving the DL transmission does not align with a scheduled time associated with the at least one UL transmission; and the measured self-interference included in the measurement report comprise wideband or subband RS SI measurements.

In some aspects, a second timing scheme of the one or more timing schemes configures the UE to adjust a starting time $t_0$ perform the self-interference measurements according to a scheduled transmission time associated with the at least one UL transmission.

In some aspects, the measured self-interference included in the measurement report comprise at least one of: wideband or subband RSSI measurements; or RSRP measurements.

In some aspects, the method 1600 further includes receiving a request to change a scheduled time of a DL transmission such that the DL transmission does not overlap with the at least one UL transmission, wherein the measured self-interference is based on the request to change the scheduled time of the DL transmission. In some cases, the operations of this step refer to, or may be performed by, circuitry for receiving and/or code for receiving as described with reference to FIG. 18.

In some aspects, the method 1600 further includes transmitting a DL transmission, wherein the measurement report indicating the measured self-interference includes an interference residual, based on the DL transmission, corresponding to the measured self-interference associated with the at least one UL transmission. In some cases, the operations of this step refer to, or may be performed by, circuitry for transmitting and/or code for transmitting as described with reference to FIG. 18.

In some aspects, receiving the measurement report comprises receiving the measurement report without requesting the UE to transmit the measurement report.

In some aspects, receiving the measurement report comprises: receiving a scheduling request to request resources for transmitting the measurement report; transmitting an uplink grant indicating resources for transmitting the measurement report; and receiving the measurement report using the resources indicated in the grant.

In some aspects, receiving the measurement report comprises receiving the measurement report in a MAC-CE using resources allocated in an existing uplink grant.

In some aspects, receiving the measurement report comprises receiving the measurement report in preconfigured periodic PUCCH resources.

In some aspects, the method 1600 further includes transmitting configuration information configuring a trigger condition for transmitting the measurement report, wherein receiving the measurement report is based on the trigger condition. In some cases, the operations of this step refer to, or may be performed by, circuitry for transmitting and/or code for transmitting as described with reference to FIG. 18.

In some aspects, the trigger condition comprises a threshold number of UL transmit-DL receive beam pairs above a threshold.

In some aspects, the measurement report includes at least one of: an identifier of at least one DL receive beam of the UE; an identifier of the at least one UL transmit beam; a TCI state identifier; an antenna panel ID associated with at least one DL receive beam of the UE; or an antenna panel ID associated with the at least one UL transmit beam.

In some aspects, the measurement report includes a wideband or subband self-interference metric for each component carrier of a plurality of component carriers associated with at least one DL receive beam of the UE.

In some aspects, the method 1600 further includes transmitting an indication of which subbands, of a plurality of subbands, to perform self-interference measurements on per component carrier. In some cases, the operations of this step refer to, or may be performed by, circuitry for transmitting and/or code for transmitting as described with reference to FIG. 18.

In some aspects, the measurement report includes a self-interference metric reported per UL transmission of the at least one UL transmission.

In some aspects, the measurement report includes, for each self-interference metric, an indication of the UL transmission of the at least one UL transmission corresponding to that self-interference metric; and the indication of the at least one UL transmission comprises at least one of: a system subframe number; a slot index; a symbol index; an identifier of the at least one UL transmit beam; or a repetition number associated with the UL transmission.

In some aspects, the measurement report includes a statistical-based self-interference metric associated with a plurality of UL transmissions, including the UL transmission, having a same TCI state measured over a time window.

In some aspects, the statistical-based self-interference metric comprises at least one of: a maximum self-interference metric among the plurality of UL transmissions; a minimum self-interference metric among the plurality of UL transmissions; an average self-interference metric among the plurality of UL transmissions; or a percentage of self-interference metrics associated with the plurality of UL transmissions.

In some aspects, the method 1600 further includes transmitting an indication of an offset between a slot in which to transmit the measurement report and an ending slot of a time window in which the self-interference measurements are to be performed, wherein receiving the measurement report is based on the offset. In some cases, the operations of this step refer to, or may be performed by, circuitry for transmitting and/or code for transmitting as described with reference to FIG. 18.

In some aspects, the plurality of UL transmissions occupy different numbers of subbands at different frequency locations; and the measurement report includes a statistical-based self-interference metric per subband of the different numbers of subbands.

In some aspects, the plurality of UL transmissions occupy different numbers of RBs at different frequency locations; and the statistical-based self-interference metric comprises a RSRP of a transmission bandwidth associated with the plurality of UL transmissions divided by a total number of RBs of the different number of RBs.

Figure 18:
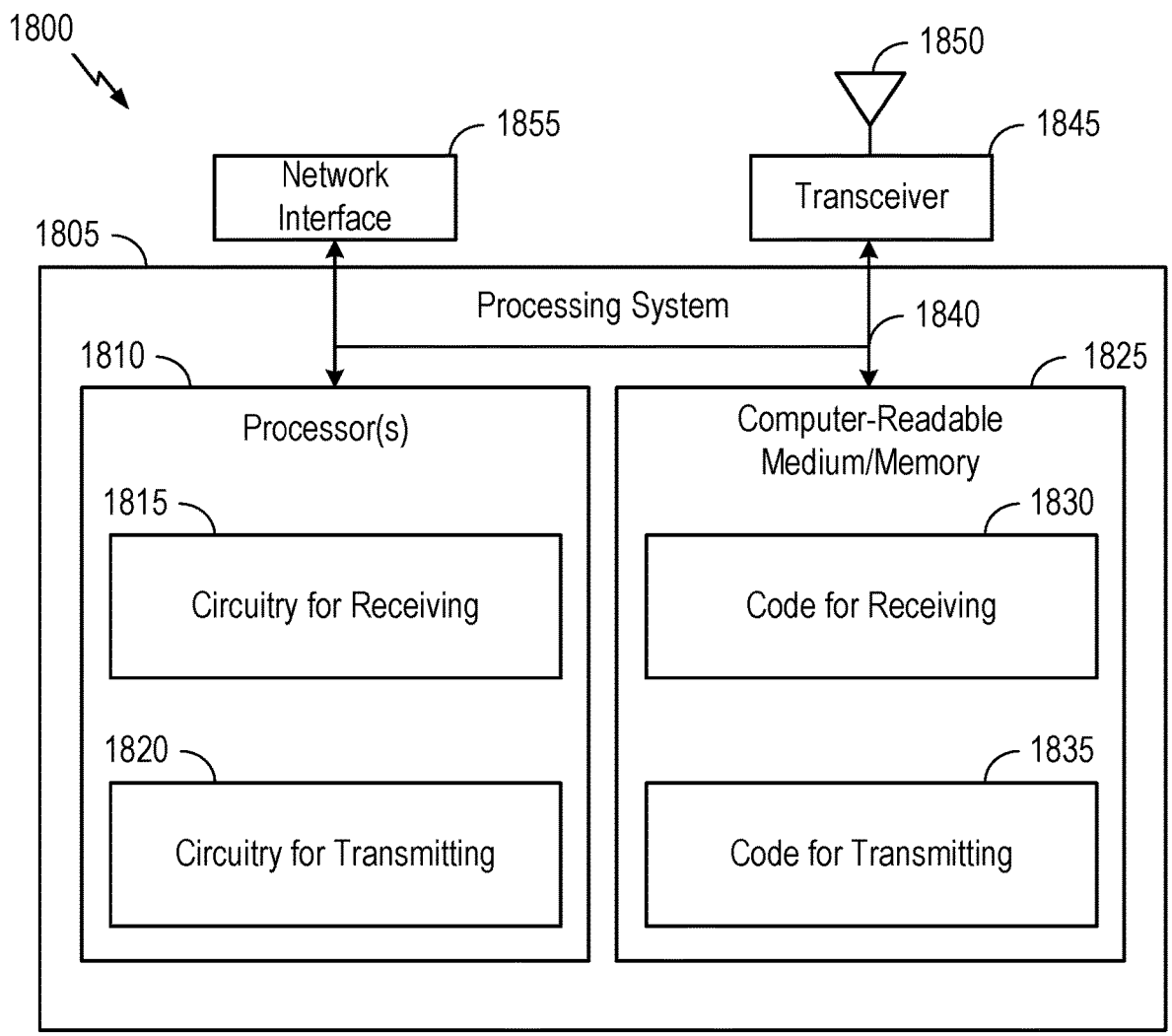
FIG. 18 depicts aspects of an example communications device.

In one aspect, method 1600, or any aspect related to it, may be performed by an apparatus, such as communications device 1800 of FIG. 18, which includes various components operable, configured, or adapted to perform the method 1600. Communications device 1800 is described below in further detail.

Note that FIG. 16 is just one example of a method, and other methods including fewer, additional, or alternative steps are possible consistent with this disclosure.

Example Communications Devices

FIG. 17 depicts aspects of an example communications device 1700. In some aspects, communications device 1700 is a user equipment, such as UE 104 described above with respect to FIGS. 1 and 3.

The communications device 1700 includes a processing system 1705 coupled to the transceiver 1785 (e.g., a transmitter and/or a receiver). The transceiver 1785 is configured to transmit and receive signals for the communications device 1700 via the antenna 1790, such as the various signals as described herein. The processing system 1705 may be configured to perform processing functions for the communications device 1700, including processing signals received and/or to be transmitted by the communications device 1700.

The processing system 1705 includes one or more processors 1710. In various aspects, the one or more processors 1710 may be representative of one or more of receive processor 358, transmit processor 364, TX MIMO processor 366, and/or controller/processor 380, as described with respect to FIG. 3. The one or more processors 1710 are coupled to a computer-readable medium/memory 1745 via a bus 1780. In certain aspects, the computer-readable medium/memory 1745 is configured to store instructions (e.g., computer-executable code) that when executed by the one or more processors 1710, cause the one or more processors 1710 to perform the method 1500 described with respect to FIG. 15, or any aspect related to it. Note that reference to a processor performing a function of communications device 1700 may include one or more processors 1710 performing that function of communications device 1700.

In the depicted example, computer-readable medium/memory 1745 stores code (e.g., executable instructions), such as code for transmitting 1750, code for performing 1755, code for selecting 1760, code for receiving 1765, code for determining 1770, and code for adjusting 1775. Processing of the code for transmitting 1750, code for performing 1755, code for selecting 1760, code for receiving 1765, code for determining 1770, and code for adjusting 1775 may cause the communications device 1700 to perform the method 1500 described with respect to FIG. 15, or any aspect related to it.

The one or more processors 1710 include circuitry configured to implement (e.g., execute) the code stored in the computer-readable medium/memory 1745, including circuitry such as circuitry for transmitting 1715, circuitry for performing 1720, circuitry for selecting 1725, circuitry for receiving 1730, circuitry for determining 1735, and circuitry for adjusting 1740. Processing with circuitry for transmitting 1715, circuitry for performing 1720, circuitry for selecting 1725, circuitry for receiving 1730, circuitry for determining 1735, and circuitry for adjusting 1740 may cause the communications device 1700 to perform the method 1500 described with respect to FIG. 15, or any aspect related to it.

Various components of the communications device 1700 may provide means for performing the method 1500 described with respect to FIG. 15, or any aspect related to it. For example, means for transmitting, sending or outputting for transmission may include transceivers 354 and/or antenna(s) 352 of the UE 104 illustrated in FIG. 3 and/or the transceiver 1785 and the antenna 1790 of the communications device 1700 in FIG. 17. Means for receiving or obtaining may include transceivers 354 and/or antenna(s) 352 of the UE 104 illustrated in FIG. 3 and/or the transceiver 1785 and the antenna 1790 of the communications device 1700 in FIG. 17.

FIG. 18 depicts aspects of an example communications device 1800. In some aspects, communications device 1800 is a network entity, such as BS 102 of FIGS. 1 and 3, or a disaggregated base station as discussed with respect to FIG. 2.

The communications device 1800 includes a processing system 1805 coupled to the transceiver 1845 (e.g., a transmitter and/or a receiver) and/or a network interface 1855. The transceiver 1845 is configured to transmit and receive signals for the communications device 1800 via the antenna 1850, such as the various signals as described herein. The network interface 1855 is configured to obtain and send signals for the communications device 1800 via communication link(s), such as a backhaul link, midhaul link, and/or fronthaul link as described herein, such as with respect to FIG. 2. The processing system 1805 may be configured to perform processing functions for the communications device 1800, including processing signals received and/or to be transmitted by the communications device 1800.

The processing system 1805 includes one or more processors 1810. In various aspects, one or more processors 1810 may be representative of one or more of receive processor 338, transmit processor 320, TX MIMO processor 330, and/or controller/processor 340, as described with respect to FIG. 3. The one or more processors 1810 are coupled to a computer-readable medium/memory 1825 via a bus 1840. In certain aspects, the computer-readable medium/memory 1825 is configured to store instructions (e.g., computer-executable code) that when executed by the one or more processors 1810, cause the one or more processors 1810 to perform the method 1600 described with respect to FIG. 16, or any aspect related to it. Note that reference to a processor of communications device 1800 performing a function may include one or more processors 1810 of communications device 1800 performing that function.

In the depicted example, the computer-readable medium/memory 1825 stores code (e.g., executable instructions), such as code for receiving 1830 and code for transmitting 1835. Processing of the code for receiving 1830 and code for transmitting 1835 may cause the communications device 1800 to perform the method 1600 described with respect to FIG. 16, or any aspect related to it.

The one or more processors 1810 include circuitry configured to implement (e.g., execute) the code stored in the computer-readable medium/memory 1825, including circuitry such as circuitry for receiving 1815 and circuitry for transmitting 1820. Processing with circuitry for receiving 1815 and circuitry for transmitting 1820 may cause the communications device 1800 to perform the method 1600 as described with respect to FIG. 16, or any aspect related to it.

Various components of the communications device 1800 may provide means for performing the method 1600 as described with respect to FIG. 16, or any aspect related to it. Means for transmitting, sending or outputting for transmission may include transceivers 332 and/or antenna(s) 334 of the BS 102 illustrated in FIG. 3 and/or the transceiver 1845 and the antenna 1850 of the communications device 1800 in FIG. 18. Means for receiving or obtaining may include transceivers 332 and/or antenna(s) 334 of the BS 102 illustrated in FIG. 3 and/or the transceiver 1845 and the antenna 1850 of the communications device 1800 in FIG. 18.

Example Clauses

Implementation examples are described in the following numbered clauses:

Clause 1: A method for wireless communication by a UE, comprising: transmitting at least one UL transmission using at least one UL transmit beam; performing self-interference measurements using at least one DL receive beam to measure, for full duplex operation, self-interference associated with the at least one UL transmission transmitted using the at least one UL transmit beam; and transmitting a measurement report indicating the measured self-interference associated with the at least one UL transmission transmitted using the at least one UL transmit beam.

Clause 2: The method of Clause 1, wherein the UL transmission comprises one of: a sounding reference signal; a demodulation reference signal; a PUCCH transmission; or a PUSCH transmission.

Clause 3: The method of any one of Clauses 1 and 2, further comprising: selecting, based on one or more rules, the at least one DL receive beam to use to measure the self-interference from a plurality of different DL receive beams.

Clause 4: The method of Clause 3, wherein the one or more rules specify to select, as the at least one DL receive beam, all DL receive beams of the plurality of different DL receive beams having an active TCI state.

Clause 5: The method of Clause 3, wherein the one or more rules specify to select, as the at least one DL receive beam, one or more DL receive beams of the plurality of different DL receive beams associated with one or more active TCI states of a received PDCCH or PDSCH.

Clause 6: The method of Clause 5, wherein: based on the one or more rules, two or more DL receive beams associated with different TCI states are selected as the at least one DL receive beam; and performing the self-interference measurements using at least one DL receive beam comprises: using a first DL receive beam of the two or more DL receive beams on a first downlink antenna panel to measure the self-interference, associated with a first UL transmission of the at least one UL transmission, for a first TCI state of the different TCI states; and using a second DL receive beam of the two or more DL receive beams on a second downlink antenna panel to measure the self-interference, associated with a second UL transmission of the at least one UL transmission, for a second TCI state of the different TCI states.

Clause 7: The method of Clause 3, wherein the one or more rules specify to select, as the at least one DL receive beam, one or more DL receive beams associated with one or more active unified multi-channel TCI states of a latest received PDSCH.

Clause 8: The method of Clause 7, wherein, for a sTRP TCI, the one or more active unified multi-channel TCI states comprise a downlink only TCI state or a joint downlink and uplink unified multi-channel TCI state.

Clause 9: The method of Clause 7, wherein, for mTRP TCI, the one or more active unified multi-channel TCI states comprise one of a downlink only TCI state, a joint downlink and uplink unified multi-channel TCI state, or both the downlink only TCI state and the joint downlink and uplink unified multi-channel TCI state.

Clause 10: The method of Clause 9, further comprising: selecting the downlink only TCI state, the joint downlink and uplink unified multi-channel TCI state, or both the downlink only TCI state and the joint downlink and uplink unified multi-channel TCI state based on an indication received from a network entity.

Clause 11: The method of Clause 10, wherein: a first value of the indication indicates to select the downlink only TCI state or the joint downlink and uplink unified multi-channel TCI state; and a second value of the indication indicates to select both the downlink only TCI state and the joint downlink and uplink unified multi-channel TCI state.

Clause 12: The method of Clause 3, wherein the one or more rules specify to select, as the at least one DL receive beam, one or more DL receive beams associated with one or more configured downlink reference signal identifiers.

Clause 13: The method of Clause 3, wherein the one or more rules specify to select, as the at least one DL receive beam, all DL receive beams associated with SSB beam identifiers corresponding to measured RSRP value greater than or equal to a threshold.

Clause 14: The method of any one of Clauses 1-13, wherein transmitting the at least one UL transmission using the at least one UL transmit beam comprises simultaneously transmitting a first UL transmission using a first UL transmit beam to a first TRP and transmitting a second UL transmission using a second UL transmit beam to a second TRP.

Clause 15: The method of Clause 14, further comprising: selecting at least one of the first UL transmit beam or the second UL transmit beam to use to measure the self-interference.

Clause 16: The method of Clause 15, wherein the first UL transmission and the second UL transmission are transmitted simultaneously using spatial division multiplexing.

Clause 17: The method of Clause 16, wherein, for sDCI based mTRP operation in which one DCI schedules the first UL transmission to the first TRP and the second UL transmission to the second TRP, the selecting at least one of the first UL transmit beam or the second UL transmit beam to use to measure the self-interference is based on signaling from a network entity.

Clause 18: The method of Clause 17, wherein the signaling from the network entity indicates to select at least one of the first UL transmit beam or the second UL transmit beam using an indication of an uplink only TCI state, a joint downlink and uplink unified multi-channel TCI state, or both an uplink only TCI state and a joint downlink and uplink unified multi-channel TCI state.

Clause 19: The method of Clause 18, wherein: the signaling from the network entity indicates to select both the first UL transmit beam and the second UL transmit beam; and performing the self-interference measurements comprises: using a first DMRS port group to measure the self-interference associated with the first UL transmit beam; and using a second DMRS port group to measure the self-interference associated with the second UL transmit beam.

Clause 20: The method of Clause 16, wherein, for mDCI based mTRP operation in which multiple DCIs respectively schedule the first UL transmission and second UL transmission to the first TRP and second TRP, the selecting at least one of the first UL transmit beam or the second UL transmit beam to use to measure the self-interference is based on an indication from a network entity.

Clause 21: The method of Clause 20, wherein the indication from the network entity indicates a COORSET pool index for the first UL transmit beam, the second UL transmit, or both the first UL transmit beam and the second UL transmit beam.

Clause 22: The method of Clause 15, wherein the first UL transmission and the second UL transmission are transmitted simultaneously using frequency division multiplexing.

Clause 23: The method of Clause 22, wherein the selecting at least one of the first UL transmit beam or the second UL transmit beam to use to measure the self-interference is based on a lowest RB index allocation associated with the first UL transmit beam or the second UL transmit beam.

Clause 24: The method of Clause 22, wherein the selecting at least one of the first UL transmit beam or the second UL transmit beam to use to measure the self-interference is based on signaling from a network entity indicating which of the first UL transmit beam or the second UL transmit beam to use.

Clause 25: The method of any one of Clauses 1-24, wherein performing the self-interference measurements is based on one or more timing schemes.

Clause 26: The method of Clause 25, further comprising: receiving, from a network entity, configuration information configuring the UE to perform the self-interference measurements and to transmit the measurement report, wherein the configuration information indicates the one or more timing schemes to use to measure the self-interference.

Clause 27: The method of Clause 25, wherein transmitting the measurement report indicating the measured self-interference comprises transmitting the measurement report indicating the measured self-interference for each timing scheme of the one or more timing schemes.

Clause 28: The method of Clause 25, further comprising: selecting one timing scheme of the one or more timing schemes to perform the self-interference measurements, wherein the measurement report indicates the one timing scheme selected to perform the self-interference measurements.

Clause 29: The method of Clause 25, wherein a first timing scheme of the one or more timing schemes configures the UE to perform the self-interference measurements based on a scheduled time for receiving a DL transmission from a network entity using the at least one DL receive beam.

Clause 30: The method of Clause 29, wherein: the scheduled time for receiving the DL transmission does not align with a scheduled time for receiving the at least one UL transmission using the at least one DL receive beam; and the self-interference measurements included in the measurement report comprise wideband or subband RS SI measurements.

Clause 31: The method of Clause 25, wherein a second timing scheme of the one or more timing schemes configures the UE to adjust a starting time $t_0$ perform the self-interference measurements using the at least one DL receive beam according to a scheduled time for receiving the at least one UL transmission using the at least one DL receive beam.

Clause 32: The method of Clause 31, wherein the self-interference measurements included in the measurement report comprise at least one of: wideband or subband RSSI measurements; or RSRP measurements.

Clause 33: The method of Clause 31, further comprising: determining a threshold number of slots prior to the at least one UL transmission that a DL transmission is not scheduled to overlap with the at least one UL transmission; and adjusting the starting time $t_0$ perform the self-interference measurements using the at least one DL receive beam according to the scheduled time for receiving the at least one UL transmission using the at least one DL receive beam based on the determination that the DL transmission is not scheduled to overlap with the at least one UL transmission.

Clause 34: The method of Clause 31, further comprising: determining a threshold number of slots prior to the at least one UL transmission that a DL transmission is scheduled to overlap with the at least one UL transmission; transmitting a request to a network entity to change a scheduled time of the DL transmission such that the DL transmission does not overlap with the at least one UL transmission; and adjusting the starting time $t_0$ perform the self-interference measurements using the at least one DL receive beam according to the scheduled time for receiving the at least one UL transmission based on the request transmitted to the network entity.

Clause 35: The method of Clause 31, further comprising: receiving a DL transmission using the at least one DL beam while performing the self-interference measurements; and performing interference cancellation on the received DL transmission to determine an interference residual corresponding to the self-interference associated with the at least one UL transmission, wherein the measurement report indicating the measured self-interference includes the interference residual.

Clause 36: The method of any one of Clauses 1-35, wherein transmitting the measurement report comprises transmitting the measurement report autonomously without being requested by a network entity.

Clause 37: The method of Clause 36, wherein transmitting the measurement report comprises: transmitting a scheduling request to the network entity to request resources for transmitting the measurement report; receiving an uplink grant indicating the resources for transmitting the measurement report; and transmitting the measurement report using the resources indicated in the grant.

Clause 38: The method of Clause 36, wherein transmitting the measurement report comprises transmitting the measurement report in a MAC-CE using resources allocated in an existing uplink grant.

Clause 39: The method of Clause 36, wherein transmitting the measurement report comprises transmitting the measurement report in preconfigured periodic PUCCH resources.

Clause 40: The method of any one of Clauses 1-39, wherein transmitting the measurement report comprises transmitting the measurement report based on a trigger condition configured by a network entity.

Clause 41: The method of Clause 40, wherein the trigger condition comprises a threshold number of UL transmit-DL receive beam pairs above a threshold.

Clause 42: The method of any one of Clauses 1-41, wherein the measurement report includes at least one of: an identifier of the at least one DL receive beam; an identifier of the at least one UL transmit beam; a TCI state identifier; an antenna panel ID associated with the at least one DL receive beam; or an antenna panel ID associated with the at least one UL transmit beam.

Clause 43: The method of any one of Clauses 1-42, wherein the measurement report includes a wideband or subband self-interference metric for each component carrier of a plurality of component carriers associated with the at least one DL receive beam.

Clause 44: The method of Clause 43, further comprising: receiving, from a network entity, an indication of which subbands, of a plurality of subbands, to perform the self-interference measurements on per component carrier.

Clause 45: The method of any one of Clauses 1-44, wherein the measurement report includes a self-interference metric reported per UL transmission of the at least one UL transmission.

Clause 46: The method of Clause 45, wherein: the measurement report includes, for each self-interference metric, an indication of the UL transmission of the at least one UL transmission corresponding to that self-interference metric; and the indication of the at least one UL transmission comprises at least one of: a system subframe number; a slot index; a symbol index; an identifier of the at least one UL transmit beam; or a repetition number associated with the UL transmission.

Clause 47: The method of any one of Clauses 1-46, wherein the measurement report includes a statistical-based self-interference metric associated with a plurality of UL transmissions, including the UL transmission, having a same TCI state measured over a time window.

Clause 48: The method of Clause 47, wherein the statistical-based self-interference metric comprises at least one of: a maximum self-interference metric among the plurality of UL transmissions; a minimum self-interference metric among the plurality of UL transmissions; an average self-interference metric among the plurality of UL transmissions; or a percentage of self-interference metrics associated with the plurality of UL transmissions.

Clause 49: The method of Clause 47, wherein: the plurality of UL transmissions occupy different numbers of subbands at different frequency locations; and the measurement report includes a statistical-based self-interference metric per subband of the different numbers of subbands.

Clause 50: The method of Clause 47, wherein: the plurality of UL transmissions occupy different numbers of RBs at different frequency locations; and the statistical-based self-interference metric comprises a RSRP of a transmission bandwidth associated with the plurality of UL transmissions divided by a total number of RBs of the different number of RBs.

Clause 51: The method of Clause 1, further comprising receiving, from a network entity, an indication of an offset between a slot in which to transmit the measurement report and an ending slot of a time window in which the self-interference measurements are performed, wherein transmitting the measurement report is based on the offset.

Clause 52: A method for wireless communication by a network entity, comprising: receiving at least one UL transmission associated at least one UL transmit beam of a UE; and receiving a measurement report, for full duplex operation, indicating a measured self-interference of the UE associated with the at least one UL transmission transmitted using the at least one UL transmit beam.

Clause 53: The method of Clause 52, wherein the UL transmission comprises one of: a sounding reference signal; a demodulation reference signal; a PUCCH transmission; or a PUSCH transmission.

Clause 54: The method of any one of Clauses 52 and 53, wherein the measurement report is based, in part, on one or more active unified multi-channel TCI states of a PDSCH transmitted by the network entity.

Clause 55: The method of Clause 54, wherein, for a sTRP TCI, the one or more active unified multi-channel TCI states comprise a downlink only TCI state or a joint downlink and uplink unified multi-channel TCI state.

Clause 56: The method of Clause 54, wherein, for mTRP TCI, the one or more active unified multi-channel TCI states comprise one of a downlink only TCI state, a joint downlink and uplink unified multi-channel TCI state, or both the downlink only TCI state and the joint downlink and uplink unified multi-channel TCI state.

Clause 57: The method of Clause 56, further comprising: transmitting an indication to select, for performing self-interference measurements, the downlink only TCI state, the joint downlink and uplink unified multi-channel TCI state, or both the downlink only TCI state and the joint downlink and uplink unified multi-channel TCI state.

Clause 58: The method of Clause 57, wherein: a first value of the indication indicates to select the downlink only TCI state or the joint downlink and uplink unified multi-channel TCI state; and a second value of the indication indicates to select both the downlink only TCI state and the joint downlink and uplink unified multi-channel TCI state.

Clause 59: The method of any one of Clauses 52-58, wherein receiving the at least one UL transmission associated with the at least one UL transmit beam comprises simultaneously receiving a first UL transmission using associated with a first UL transmit beam at a first TRP and receiving a second UL transmission associated with a second UL transmit beam at a second TRP.

Clause 60: The method of Clause 59, wherein the first UL transmission and the second UL transmission are received simultaneously using spatial division multiplexing.

Clause 61: The method of Clause 59, further comprising, for sDCI based mTRP operation in which one DCI schedules the first UL transmission to the first TRP and the second UL transmission to the second TRP, transmitting signaling indicating to select at least one of the first UL transmit beam or the second UL transmit beam to use to measure the self-interference.

Clause 62: The method of Clause 61, wherein the signaling indicates to select at least one of the first UL transmit beam or the second UL transmit beam using an indication of an uplink only TCI state, a joint downlink and uplink unified multi-channel TCI state, or both an uplink only TCI state and a joint downlink and uplink unified multi-channel TCI state.

Clause 63: The method of Clause 62, wherein: the signaling indicates to select both the first UL transmit beam and the second UL transmit beam; and the measured self-interference in the measurement report is based on: a first DMRS port group used to measure the self-interference associated with the first UL transmit beam; and a second DMRS port group used to measure the self-interference associated with the second UL transmit beam.

Clause 64: The method of Clause 59, further comprising, for mDCI based mTRP operation in which multiple DCIs respectively schedule the first UL transmission and second UL transmission to the first TRP and second TRP, transmitting an indication to select at least one of the first UL transmit beam or the second UL transmit beam to use to measure the self-interference.

Clause 65: The method of Clause 64, wherein the indication indicates a COORSET pool index for the first UL transmit beam, the second UL transmit, or both the first UL transmit beam and the second UL transmit beam.

Clause 66: The method of Clause 59, wherein the first UL transmission and the second UL transmission are received simultaneously using frequency division multiplexing.

Clause 67: The method of Clause 66, wherein measured self-interference is in the measurement report is based on a lowest RB index allocation associated with the first UL transmit beam or the second UL transmit beam.

Clause 68: The method of Clause 66, further comprising: transmitting signaling indicating which of the first UL transmit beam or the second UL transmit beam to use to measure the self-interference.

Clause 69: The method of any one of Clauses 52-68, wherein the measured self-interference is based on one or more timing schemes.

Clause 70: The method of Clause 69, further comprising: transmitting configuration information configuring the UE to: perform self-interference measurements corresponding to the measured-self interference received in the measurement report; and transmit the measurement report, wherein the configuration information indicates the one or more timing schemes to use to measure the self-interference.

Clause 71: The method of Clause 69, wherein the measurement report indicates the measured self-interference for each timing scheme of the one or more timing schemes.

Clause 72: The method of Clause 69, wherein the measured self-interference is associated with one timing scheme of the one or more timing schemes, wherein the measurement report indicates the one timing scheme.

Clause 73: The method of Clause 69, wherein a first timing scheme of the one or more timing schemes configures the UE to perform the self-interference measurements based on a scheduled time for receiving a DL transmission from the network entity.

Clause 74: The method of Clause 73, wherein: the scheduled time for receiving the DL transmission does not align with a scheduled time associated with the at least one UL transmission; and the measured self-interference included in the measurement report comprise wideband or subband RSSI measurements.

Clause 75: The method of Clause 69, wherein a second timing scheme of the one or more timing schemes configures the UE to adjust a starting time $t_0$ perform the self-interference measurements according to a scheduled transmission time associated with the at least one UL transmission.

Clause 76: The method of Clause 75, wherein the measured self-interference included in the measurement report comprise at least one of: wideband or subband RSSI measurements; or RSRP measurements.

Clause 77: The method of Clause 75, further comprising: receiving a request to change a scheduled time of a DL transmission such that the DL transmission does not overlap with the at least one UL transmission, wherein the measured self-interference is based on the request to change the scheduled time of the DL transmission.

Clause 78: The method of Clause 75, further comprising: transmitting a DL transmission, wherein the measurement report indicating the measured self-interference includes an interference residual, based on the DL transmission, corresponding to the measured self-interference associated with the at least one UL transmission.

Clause 79: The method of any one of Clauses 52-78, wherein receiving the measurement report comprises receiving the measurement report without requesting the UE to transmit the measurement report.

Clause 80: The method of Clause 79, wherein receiving the measurement report comprises: receiving a scheduling request to request resources for transmitting the measurement report; transmitting an uplink grant indicating resources for transmitting the measurement report; and receiving the measurement report using the resources indicated in the grant.

Clause 81: The method of Clause 79, wherein receiving the measurement report comprises receiving the measurement report in a MAC-CE using resources allocated in an existing uplink grant.

Clause 82: The method of Clause 79, wherein receiving the measurement report comprises receiving the measurement report in preconfigured periodic PUCCH resources.

Clause 83: The method of any one of Clauses 52-82, further comprising: transmitting configuration information configuring a trigger condition for transmitting the measurement report, wherein receiving the measurement report is based on the trigger condition.

Clause 84: The method of Clause 83, wherein the trigger condition comprises a threshold number of UL transmit-DL receive beam pairs above a threshold.

Clause 85: The method of any one of Clauses 52-84, wherein the measurement report includes at least one of: an identifier of at least one DL receive beam of the UE; an identifier of the at least one UL transmit beam; a TCI state identifier; an antenna panel ID associated with at least one DL receive beam of the UE; or an antenna panel ID associated with the at least one UL transmit beam.

Clause 86: The method of any one of Clauses 52-85, wherein the measurement report includes a wideband or subband self-interference metric for each component carrier of a plurality of component carriers associated with at least one DL receive beam of the UE.

Clause 87: The method of Clause 86, further comprising: transmitting an indication of which subbands, of a plurality of subbands, to perform self-interference measurements on per component carrier.

Clause 88: The method of any one of Clauses 52-87, wherein the measurement report includes a self-interference metric reported per UL transmission of the at least one UL transmission.

Clause 89: The method of Clause 88, wherein: the measurement report includes, for each self-interference metric, an indication of the UL transmission of the at least one UL transmission corresponding to that self-interference metric; and the indication of the at least one UL transmission comprises at least one of: a system subframe number; a slot index; a symbol index; an identifier of the at least one UL transmit beam; or a repetition number associated with the UL transmission.

Clause 90: The method of any one of Clauses 52-89, wherein the measurement report includes a statistical-based self-interference metric associated with a plurality of UL transmissions, including the UL transmission, having a same TCI state measured over a time window.

Clause 91: The method of Clause 90, wherein the statistical-based self-interference metric comprises at least one of: a maximum self-interference metric among the plurality of UL transmissions; a minimum self-interference metric among the plurality of UL transmissions; an average self-interference metric among the plurality of UL transmissions; or a percentage of self-interference metrics associated with the plurality of UL transmissions.

Clause 92: The method of Clause 90, wherein: the plurality of UL transmissions occupy different numbers of subbands at different frequency locations; and the measurement report includes a statistical-based self-interference metric per subband of the different numbers of subbands.

Clause 93: The method of Clause 90, wherein: the plurality of UL transmissions occupy different numbers of RBs at different frequency locations; and the statistical-based self-interference metric comprises a RSRP of a transmission bandwidth associated with the plurality of UL transmissions divided by a total number of RBs of the different number of RBs.

Clause 94: The method of any one of Clauses 52-93, further comprising transmitting an indication of an offset between a slot in which to transmit the measurement report and an ending slot of a time window in which the self-interference measurements are to be performed, wherein receiving the measurement report is based on the offset.

Clause 95: An apparatus, comprising: a memory comprising executable instructions; and a processor configured to execute the executable instructions and cause the apparatus to perform a method in accordance with any one of Clauses 1-94.

Clause 96: An apparatus, comprising means for performing a method in accordance with any one of Clauses 1-94.

Clause 97: A non-transitory computer-readable medium comprising executable instructions that, when executed by a processor of an apparatus, cause the apparatus to perform a method in accordance with any one of Clauses 1-94.

Clause 98: A computer program product embodied on a computer-readable storage medium comprising code for performing a method in accordance with any one of Clauses 1-94.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
at least one memory comprising executable instructions; and
one or more processors configured to execute the executable instructions to cause the UE to:
transmit at least one uplink (UL) transmission using at least one UL transmit beam, wherein, to transmit the at least one UL transmission using the at least one UL transmit beam, the one or more processors are configured to cause the UE to simultaneously transmit a first UL transmission using a first UL transmit beam to a first transmission reception point (TRP) and transmit a second UL transmission using a second UL transmit beam to a second TRP;
select at least one of the first UL transmit beam or the second UL transmit beam to use self-interference interference measurements;
perform the self-interference measurements, in accordance with the selection, using at least one downlink (DL) receive beam to measure, for full duplex operation, self-interference during the simultaneous transmission of the first UL transmission and the second UL transmission; and
transmit a measurement report indicating the self-interference measurements.

2. The UE of claim 1, wherein the UL transmission comprises one of:
a sounding reference signal;
a demodulation reference signal;
a physical uplink control channel (PUCCH) transmission; or
a physical uplink shared channel (PUSCH) transmission.

3. The UE of claim 1, wherein the one or more processors are further configured to cause the UE to select, based on one or more rules, the at least one DL receive beam to use to measure the self-interference from a plurality of different DL receive beams.

4. The UE of claim 3, wherein the one or more rules specify to select, as the at least one DL receive beam, all DL receive beams of the plurality of different DL receive beams having an active transmission configuration indication (TCI) state.

5. The UE of claim 3, wherein:
the one or more rules specify to select, as the at least one DL receive beam, one or more DL receive beams of the plurality of different DL receive beams associated with one or more active transmission configuration indication (TCI) states of a received physical downlink control channel (PDCCH) or physical downlink shared channel (PDSCH);
based on the one or more rules, two or more DL receive beams associated with different TCI states are selected as the at least one DL receive beam; and
in order to perform the self-interference measurements using at least one DL receive beam, the one or more processors are configured to cause the UE to:
use a first DL receive beam of the two or more DL receive beams on a first downlink antenna panel to measure the self-interference, associated with a first UL transmission of the at least one UL transmission, for a first TCI state of the different TCI states; and
use a second DL receive beam of the two or more DL receive beams on a second downlink antenna panel to measure the self-interference, associated with a second UL transmission of the at least one UL transmission, for a second TCI state of the different TCI states.

6. The UE of claim 3, wherein the one or more rules specify to select, as the at least one DL receive beam, one or more DL receive beams associated with one or more active unified multi-channel transmission configuration indication (TCI) states of a received downlink shared channel (PDSCH).

7. The UE of claim 6, wherein, for a single transmission reception point (sTRP) TCI, the one or more active unified multi-channel TCI states comprise a downlink only TCI state or a joint downlink and uplink unified multi-channel TCI state.

8. The UE of claim 6, wherein:
for multiple transmission reception point (mTRP) TCI, the one or more active unified multi-channel TCI states comprise one of a downlink only TCI state, a joint downlink and uplink unified multi-channel TCI state, or both the downlink only TCI state and the joint downlink and uplink unified multi-channel TCI state;
the one or more processors are further configured to cause the UE to select the downlink only TCI state, the joint downlink and uplink unified multi-channel TCI state, or both the downlink only TCI state and the joint downlink and uplink unified multi-channel TCI state based on an indication received from a network entity;
a first value of the indication indicates to select the downlink only TCI state or the joint downlink and uplink unified multi-channel TCI state; and
a second value of the indication indicates to select both the downlink only TCI state and the joint downlink and uplink unified multi-channel TCI state.

9. The UE of claim 3, wherein one of:
the one or more rules specify to select, as the at least one DL receive beam, one or more DL receive beams associated with one or more configured downlink reference signal identifiers; or
the one or more rules specify to select, as the at least one DL receive beam, all DL receive beams associated with synchronization signal block (SSB) beam identifiers corresponding to measured RSRP value greater than or equal to a threshold.

10. The UE of claim 1, wherein:
the first UL transmission and the second UL transmission are transmitted simultaneously using spatial division multiplexing;
for single downlink control information (sDCI) based multi-TRP (mTRP) operation in which one DCI schedules the first UL transmission to the first TRP and the second UL transmission to the second TRP, the selecting at least one of the first UL transmit beam or the second UL transmit beam to use to measure the self-interference is based on signaling from a network entity; and
the signaling from the network entity indicates to select at least one of the first UL transmit beam or the second UL transmit beam using an indication of an uplink only TCI state, a joint downlink and uplink unified multi-channel TCI state, or both an uplink only TCI state and a joint downlink and uplink unified multi-channel TCI state.

11. The UE of claim 10, wherein:
the signaling from the network entity indicates to select both the first UL transmit beam and the second UL transmit beam; and
performing the self-interference measurements comprises:
using a first demodulation reference signal (DMRS) port group to measure the self-interference associated with the first UL transmit beam; and
using a second DMRS port group to measure the self-interference associated with the second UL transmit beam.

12. The UE of claim 1, wherein:
the first UL transmission and the second UL transmission are transmitted simultaneously using spatial division multiplexing;
for multi downlink control information (mDCI) based multi-TRP (mTRP) operation in which multiple DCIs respectively schedule the first UL transmission and second UL transmission to the first TRP and second TRP, the selecting at least one of the first UL transmit beam or the second UL transmit beam to use to measure the self-interference is based on an indication from a network entity; and
the indication from the network entity indicates a control resource set (COORSET) pool index for the first UL transmit beam, the second UL transmit, or both the first UL transmit beam and the second UL transmit beam.

13. The UE of claim 1, wherein:
the first UL transmission and the second UL transmission are transmitted simultaneously using frequency division multiplexing; and
one of:
the selecting at least one of the first UL transmit beam or the second UL transmit beam to use to measure the self-interference is based on a lowest resource block (RB) index allocation associated with the first UL transmit beam or the second UL transmit beam; or
the selecting at least one of the first UL transmit beam or the second UL transmit beam to use to measure the self-interference is based on signaling from a network entity indicating which of the first UL transmit beam or the second UL transmit beam to use.

14. The UE of claim 1, wherein the one or more processors are further configured to cause the UE to receive, from a network entity, configuration information configuring the UE to perform the self-interference measurements and to transmit the measurement report, wherein the configuration information indicates one or more timing schemes to use to measure the self-interference.

15. The UE of claim 1, wherein:
the one or more processors are configured to cause the UE to perform the self-interference measurements based on one or more timing schemes; and
one of:
in order to transmit the measurement report indicating the measured self-interference, the one or more processors are configured to cause the UE to transmit the measurement report indicating the measured self-interference for each timing scheme of the one or more timing schemes; or
the one or more processors are further configured to cause the UE to select one timing scheme of the one or more timing schemes to perform the self-interference measurements, wherein the measurement report indicates the one timing scheme selected to perform the self-interference measurements.

16. The UE of claim 1, wherein:
the one or more processors are configured to cause the UE to perform the self-interference measurements based on one or more timing schemes;
the one or more timing schemes configures the UE to perform the self-interference measurements based on a scheduled time for receiving a DL transmission from a network entity using the at least one DL receive beam;
the scheduled time for receiving the DL transmission does not align with a scheduled time for receiving the at least one UL transmission using the at least one DL receive beam; and the self-interference measurements included in the measurement report comprise wideband or subband received signal strength indicator (RSSI) measurements.

17. The UE of claim 1, wherein:
the one or more processors are configured to cause the UE to perform the self-interference measurements based on one or more timing schemes;
the one or more timing schemes configures the UE to adjust a starting time to perform the self-interference measurements using the at least one DL receive beam according to a scheduled time for receiving the at least one UL transmission using the at least one DL receive beam; and
the self-interference measurements included in the measurement report comprise at least one of:
wideband or subband received signal strength indicator (RSSI) measurements; or
reference signal received power (RSRP) measurements.

18. The UE of claim 17, wherein the one or more processors are further configured to cause the UE to:
determine a threshold number of slots prior to the at least one UL transmission that a DL transmission is not scheduled to overlap with the at least one UL transmission; and
adjust the starting time to perform the self-interference measurements using the at least one DL receive beam according to the scheduled time for receiving the at least one UL transmission using the at least one DL receive beam based on the determination that the DL transmission is not scheduled to overlap with the at least one UL transmission; or
the method further comprises:
determine a threshold number of slots prior to the at least one UL transmission that a DL transmission is scheduled to overlap with the at least one UL transmission;
transmit a request to a network entity to change a scheduled time of the DL transmission such that the DL transmission does not overlap with the at least one UL transmission; and
adjust the starting time to perform the self-interference measurements using the at least one DL receive beam according to the scheduled time for receiving the at least one UL transmission based on the request transmitted to the network entity.

19. The UE of claim 17, the one or more processors are further configured to cause the UE to:
receive receiving a DL transmission using the at least one DL beam while performing the self-interference measurements; and
perform interference cancellation on the received DL transmission to determine an interference residual corresponding to the self-interference associated with the at least one UL transmission, wherein the measurement report indicating the measured self-interference includes the interference residual.

20. The UE of claim 1, wherein one of:
the one or more processors are configured to cause the UE to transmit the measurement report autonomously without being requested by a network entity; or
to transmit the measurement report, the one or more processors are configured to cause the UE to:
transmit a scheduling request to the network entity to request resources for transmitting the measurement report;
receive an uplink grant indicating the resources for transmitting the measurement report; and
transmit the measurement report using the resources indicated in the grant.

21. The UE of claim 20, wherein to transmit the measurement report, the one or more processors are configured to cause the UE to one of:
transmit the measurement report in a media access control-control element (MAC-CE) using resources allocated in an existing uplink grant; or
transmit the measurement report comprises transmitting the measurement report in preconfigured periodic physical uplink control channel (PUCCH) resources.

22. The UE of claim 1, wherein:
the one or more processors are configured to cause the UE to transmit the measurement report based on a trigger condition configured by a network entity; and
the trigger condition comprises a threshold number of UL transmit-DL receive beam pairs above a threshold.

23. The UE of claim 1, wherein the measurement report includes at least one of:
an identifier of the at least one DL receive beam;
an identifier of the at least one UL transmit beam;
a transmission configuration identifier (TCI) state identifier;
an antenna panel ID associated with the at least one DL receive beam; or
an antenna panel ID associated with the at least one UL transmit beam.

24. The UE of claim 1, wherein:
the measurement report includes a wideband or subband self-interference metric for each component carrier of a plurality of component carriers associated with the at least one DL receive beam; and
the one or more processors are further configured to cause the UE to receive, from a network entity, an indication of which subbands, of a plurality of subbands, to perform the self-interference measurements on per component carrier.

25. The UE of claim 1, wherein:
the measurement report includes a self-interference metric reported per UL transmission of the at least one UL transmission;
the measurement report includes, for each self-interference metric, an indication of the UL transmission of the at least one UL transmission corresponding to that self-interference metric; and
the indication of the at least one UL transmission comprises at least one of:
a system subframe number;
a slot index;
a symbol index;
an identifier of the at least one UL transmit beam; or
a repetition number associated with the UL transmission.

26. The UE of claim 1, wherein:
the measurement report includes a statistical-based self-interference metric associated with a plurality of UL transmissions, including the UL transmission, having a same transmission configuration indication (TCI) state measured over a time window; and
the statistical-based self-interference metric comprises at least one of:
a maximum self-interference metric among the plurality of UL transmissions;
a minimum self-interference metric among the plurality of UL transmissions;

an average self-interference metric among the plurality of UL transmissions; or a percentage of self-interference metrics associated with the plurality of UL transmissions.

27. The UE of claim 1, wherein the one or more processors are further configured to cause the UE to receive, from a network entity, an indication of an offset between a slot in which to transmit the measurement report and an ending slot of a time window in which the self-interference measurements are performed, wherein transmitting the measurement report is based on the offset.

28. The UE of claim 1, wherein the measurement report includes a statistical-based self-interference metric associated with a plurality of UL transmissions, including the UL transmission, having a same transmission configuration indication (TCI) state measured over a time window; and one of:

the plurality of UL transmissions occupy different numbers of subbands at different frequency locations; and the measurement report includes a statistical-based self-interference metric per subband of the different numbers of subbands; or the plurality of UL transmissions occupy different numbers of resource blocks (RBs) at different frequency locations; and the statistical-based self-interference metric comprises a reference signal receive power (RSRP) of a transmission bandwidth associated with the plurality of UL transmissions divided by a total number of RBs of the different number of RBs.

29. A method for wireless communication by user equipment (UE), comprising:

transmitting at least one uplink (UL) transmission using at least one UL transmit beam, wherein transmitting the at least one UL transmission using the at least one UL transmit beam comprises simultaneously transmitting a first UL transmission using a first UL transmit beam to a first transmission reception point (TRP) and transmitting a second UL transmission using a second UL transmit beam to a second TRP;

selecting at least one of the first UL transmit beam or the second UL transmit beam to use self-interference interference measurements;

performing the self-interference measurements, in accordance with the selection, using at least one downlink (DL) receive beam to measure, for full duplex operation, self-interference during the simultaneous transmission of the first UL transmission and the second UL transmission; and transmitting a measurement report indicating the self-interference measurements.

* * * * *